United States Patent
Kosugi et al.

(10) Patent No.: US 6,798,927 B2
(45) Date of Patent: Sep. 28, 2004

(54) CONVERSION OF PIXEL DATA FOR INTERPOLATION OR IMAGE REDUCTION, USING A SMALL MEMORY

(75) Inventors: Masato Kosugi, Yokohama (JP); Hideyuki Rengakuji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/458,301

(22) Filed: Jun. 11, 2003

(65) Prior Publication Data

US 2003/0206666 A1 Nov. 6, 2003

Related U.S. Application Data

(62) Division of application No. 09/264,716, filed on Mar. 9, 1999, now Pat. No. 6,640,019.

(30) Foreign Application Priority Data

Mar. 11, 1998 (JP) .......................................... 10-060110

(51) Int. Cl.⁷ ............................................... G06K 9/32
(52) U.S. Cl. ...................................... 382/299; 358/1.2
(58) Field of Search ................................ 382/232, 233, 382/298, 299, 305; 358/1.2, 1.16, 451, 528; 345/667, 671; 348/561, 562, 581, 582, 441

(56) References Cited

U.S. PATENT DOCUMENTS

| | | | |
|---|---|---|---|
| 4,764,805 A | * 8/1988 | Rabbani et al. | 375/240.01 |
| 5,113,455 A | 5/1992 | Scott | 382/298 |
| 5,231,679 A | 7/1993 | Matsuura et al. | 382/232 |
| 5,289,292 A | 2/1994 | Osada et al. | 358/451 |
| 5,812,791 A | * 9/1998 | Wasserman et al. | 709/247 |
| 5,844,541 A | 12/1998 | Cahill, III | 345/667 |
| 6,075,897 A | 6/2000 | Kosugi | 382/232 |
| 6,212,300 B1 | 4/2001 | Rengakuji | 382/232 |
| 6,219,464 B1 | * 4/2001 | Greggain et al. | 382/298 |
| 6,266,446 B1 | 7/2001 | Rengakuji | 382/232 |

* cited by examiner

Primary Examiner—Timothy M. Johnson
(74) Attorney, Agent, or Firm—Fitzpatrick, Cella, Harper & Scinto

(57) ABSTRACT

An image processing apparatus and method capable of decoding and varying at high speed encoded image data having an arbitrary image size by using a memory of a small capacity, and a recording medium storing programs executing such a method are provided. In the image processing apparatus and method, image data encoded in each of block units is decoded in the block unit basis. In order to convert the decoded block scan sequential image data into raster scan sequential image data, the decoded image data is divided in the horizontal direction and converted, and the divided and converted data is varied.

7 Claims, 20 Drawing Sheets

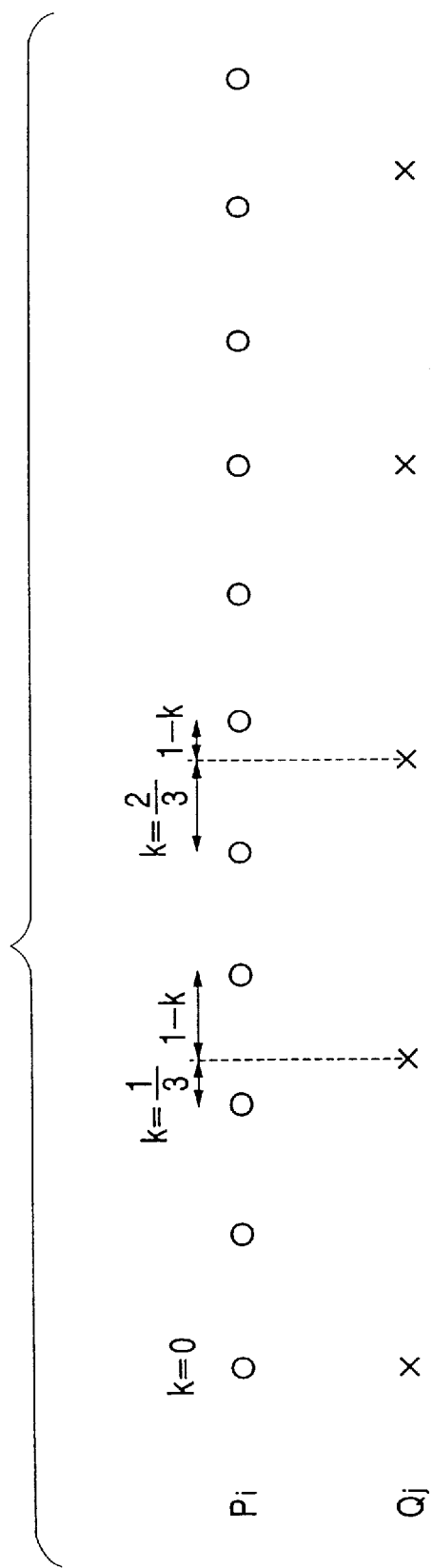

CONVERSION OF PIXEL DATA FOR INTERPOLATION OR IMAGE REDUCTION, USING A SMALL MEMORY

This application is a division of application Ser. No. 09/264,716, filed on Mar. 9, 1999, now U.S. Pat. No. 6,640,019, the entire disclosure of which is incorporated herein by reference.

BACKGROUND OF THE INVENTION

1. Field of the Invention

The present invention relates to an image processing apparatus and method suitable for performing a process of expanding and reproducing compressed image data used by an image signal recording/reproducing apparatus, and to a computer readable storage medium storing processes for realizing such a method.

2. Related Background Art

Digital image data is generally compressed in the unit of block by utilizing DCT (Discrete Cosine Transform) of JPEG (Joint Photographic Expert Group) or the like. In order to expand and display data compressed through DCT, it is necessary to block-to-raster convert the expanded data. In order to perform a block/raster conversion, it is necessary to use a conversion memory having a minimum capacity of Ha×8 (lines) words where Ha is the number of horizontal pixels of image data. Although the size of image data capable of being expanded has been limited by the size of the conversion memory, a method has been proposed by which image data having an arbitrary pixel size can be expanded independently from the size of a conversion memory.

FIG. 1 is a block diagram showing an example of a conventional image processing apparatus for expanding image data having an arbitrary pixel size. In FIG. 1, reference numeral 2001 represents a recording medium such as a memory card, reference numeral 2002 represents an interface (I/F) circuit for the recording medium, reference numeral 2003 represents an expansion circuit for expanding JPEG data in the unit of block, reference numeral 2004 represents a block/raster converting circuit for converting expanded data from blocks to rasters, reference numeral 2005 represents a buffer memory for block/raster conversion having a size of Ha×8 words, reference numeral 2007 represents a DRAM for storing expanded image data, and reference numeral 2006 represents a controller for controlling DRAM 2007.

In reproducing JPEG data stored in the recording medium 2001, compressed data read via the I/F circuit 2002 is first expanded by the expansion circuit 2003 to form expanded image data in the block sequential order. The expanded image data is written in the buffer memory 2005 in the block sequential order by the block/raster converting circuit 2004, and read in the raster sequential order to thereby convert the block image data into raster image data which is stored in DRAM 2007 under the control of the memory controller 2006.

FIG. 2 illustrates a concept of a process to be executed for DRAM 2007 when Hp is larger than Ha. For example, if Hp=1024 and Ha=640, as shown in FIG. 2 the image data is divided into blocks each having a size of 640 pixels×8 lines or a size of 384×8 lines and expanded. Namely, the expansion circuit 2003 expands image data of MCU (Minimum Code Unit) of 640×8 lines, and the block/raster converting circuit 2004 writes the expanded image data into the buffer memory 2005 to perform a block/raster conversion process. The DRAM controller 2006 writes raster image data having a size of 640 pixels×8 lines starting from a pointer P1 shown in FIG. 2 in a raster 1 area. After the next image data of 384 pixels×8 lines is expanded and written in the buffer memory 2005, a block/raster conversion is performed and the DRAM controller 2006 writes raster image data having a size of 384 pixels×8 lines starting from a pointer P2 shown in FIG. 2 in a raster 2 area. Thereafter, a raster 3, a raster 4, a raster 5, . . . are sequentially processed in a similar manner. In this way, image data having an arbitrary pixel size can be expanded independently from the size of the buffer memory 2005.

However, the above-described conventional apparatus does not take into consideration the case wherein image data of non-square pixels are converted into image data of square pixels. Still further, it does not consider the case wherein image data is required to be expanded or reduced to about 760×490 pixels in order to display expanded image data on a TV or the like. More specifically, if image data is to be expanded to 1024×786 pixels, the data amount is 1024×768×2×8=12582912 (bits), whereas if image data is to be expanded to 2048×1536 pixels, the data amount is 50331648 (bits). This data amount of a memory (DRAM) is very large as compared to about 4 Mbit necessary for image data display. Because of such a large memory and a number of accesses to DRAM, the efficiency of the apparatus is very poor in terms of a processing speed, a consumption power, and a cost.

SUMMARY OF THE INVENTION

Under the above-described background of the invention, it is an object of the present invention to provide an image processing apparatus and method capable of expanding, varying and reproducing encoded image data having an arbitrary size at high speed by using a memory of a smaller capacity, and to provide a computer readable storage medium storing processes realizing such a method.

In order to achieve the above object of the invention, a preferred embodiment provides an image processing method comprising the steps of: sequentially inputting image data encoded in each of block units; decoding the encoded image data in each of the block units; converting the decoded image data in a block scan sequential order into image data in a raster scan sequential order, the converting step performing a conversion process by dividing the decoded image data in a horizontal direction and outputting the divided image data obtained by the conversion process; and varying the divided image data obtained by the conversion process.

Another preferred embodiment provides a computer readable storage medium which stores a program comprising: an input process of sequentially inputting image data encoded in each of block units; a decoding process of decoding the encoded image data in each of the block units; a converting process of converting the decoded image data in a block scan sequential order into image data in a raster scan sequential order, the converting process performing a conversion process by dividing the decoded image data in a horizontal direction and outputting the divided image data obtained by the conversion process; and a varying process of the divided image data obtained by the conversion process.

Other objects, features and advantages of the invention will become apparent from the following detailed description taken in conjunction with the accompanying drawings.

BRIEF DESCRIPTION OF THE DRAWINGS

FIG. 5 is a diagram illustrating a concept of an image data reducing process of the first embodiment.

DETAILED DESCRIPTION OF THE PREFERRED EMBODIMENTS (First Embodiment)

Figure 3:
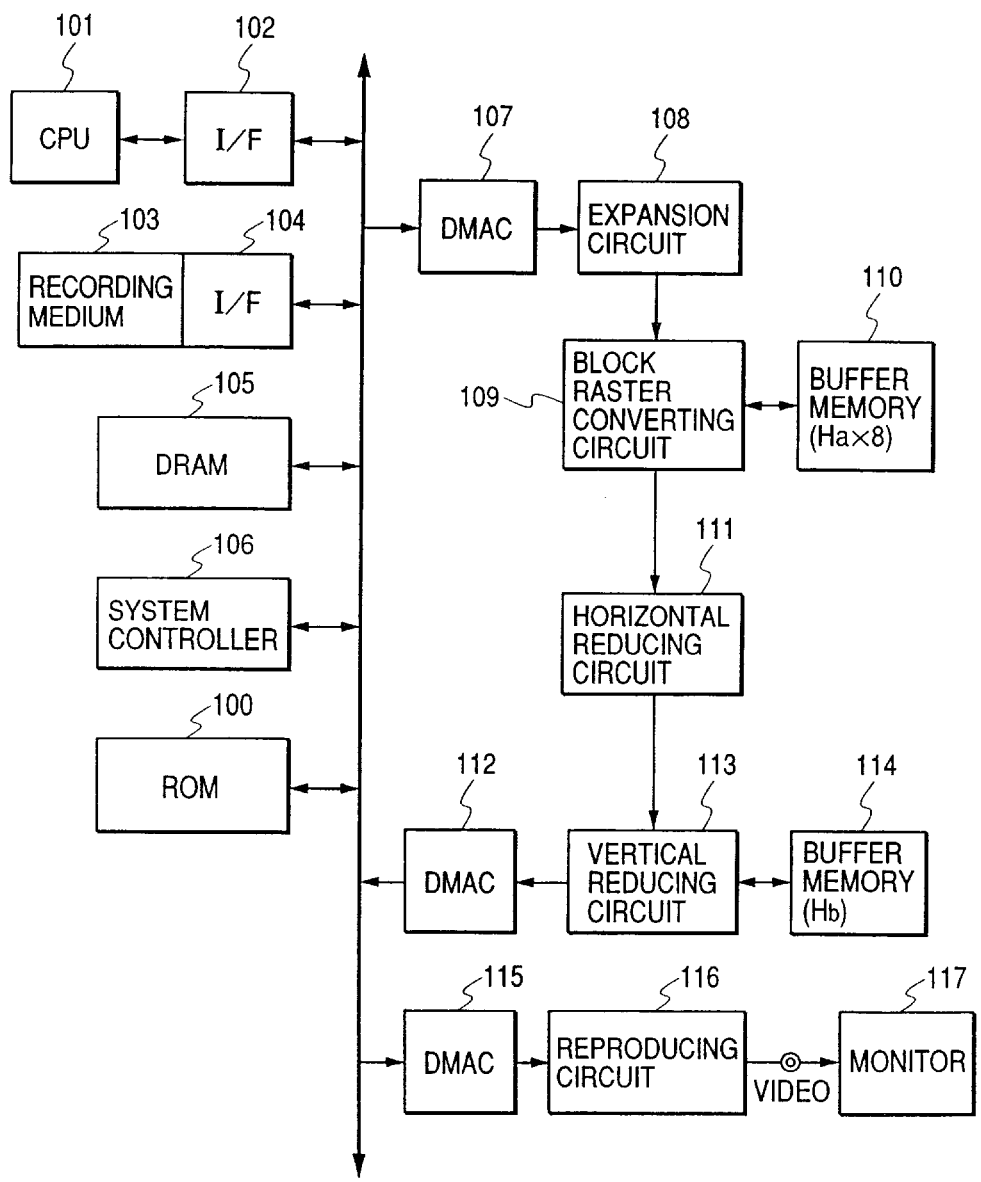
FIG. 3 is a block diagram showing the structure of an image processing apparatus according to a first embodiment of the invention.

FIG. 3 is a block diagram showing an image processing apparatus according to the first embodiment of the invention. In FIG. 3, reference numeral 101 represents a CPU (Central Processor Unit) for controlling the whole system, reference numeral 102 represents an interface circuit of CPU 101, reference numeral 103 represents a recording medium such as a memory card, reference numeral 104 represents an interface circuit of the recording medium 103, reference numeral 105 represents a DRAM for storing image data, reference numeral 106 represents a system controller for system sequential control, bus arbitration control and the like, and reference numeral 108 represents a known expansion circuit for expanding JPEG data on a block unit basis.

Reference numeral 107 represents a direct memory access controller (hereinafter described as DMAC) for transferring data in DRAM 105 to the expansion circuit 108, reference numeral 109 represents a block/raster converting circuit for converting block scan image data expanded by the expansion circuit 108 into raster scan image data, and reference numeral 110 represents a buffer memory for block/raster conversion having a capacity of Ha×8 words. The block/raster converting circuit 109 can therefore convert block scan data up to the horizontal pixels Ha into raster scan data at a time. Reference numeral 111 represents a horizontal reducing circuit constituting a varying means for performing horizontal reducing through linear interpolation or the like, the internal structure and the like of this circuit 111 being described later. Reference numeral 113 represents a vertical reducing circuit constituting a varying means for performing vertical reducing through linear interpolation or the like, the internal structure and the like of this circuit 113 being described later.

Reference numeral 114 represents a buffer memory to be used by the vertical reducing circuit 113, the buffer memory 114 having a capacity of Hb words, i.e., serving as a delay line of one line of horizontal pixels Hb. Reference numeral 112 represents a DMAC for two-dimensionally DMA transferring an output of the vertical reducing circuit 113 to DRAM 105, the operation and the like of DMAC 112 being described later. Reference numeral 115 represents a DMAC for transferring image data in DRAM 105 to a reproducing circuit 116, this DMAC being also a two-dimensional DMAC. The reproducing circuit 116 generates a video signal from image data through modulation, sync signal addition, DA conversion and the like. Reference numeral 117 represents a monitor for displaying the video signal reproduced by the reproducing circuit 116.

Reference numeral 100 represents a ROM constituting the storage medium of this invention. ROM 100 stores programs to be executed by CPU 101, the programs including processes illustrated in the flow charts shown in FIGS. 6, 8, 9 and 11 to be later described. The storage medium may be a semiconductor memory, an optical disk, a magneto-optical disk, a magnetic medium or the like.

Figure 1:
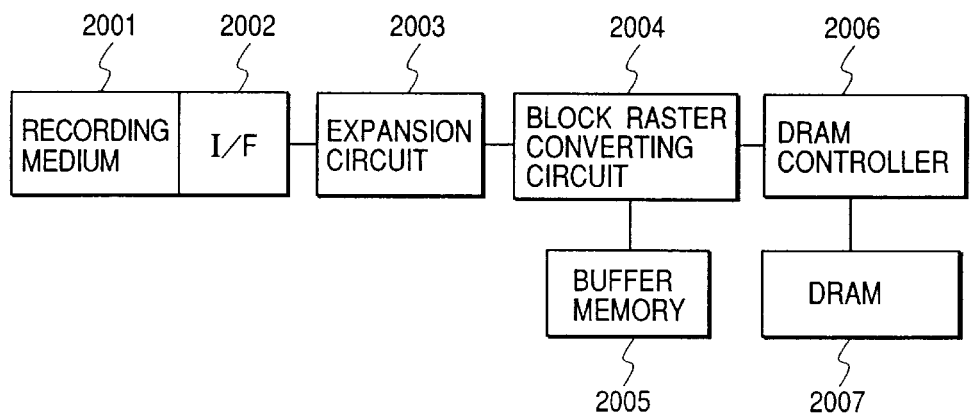
FIG. 1 is a block diagram showing a conventional image processing apparatus.
Figure 4:
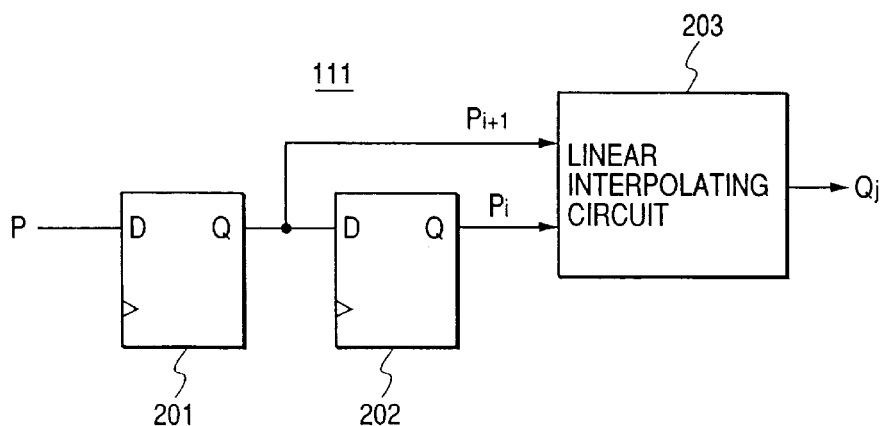
FIG. 4 is a detailed block diagram of a horizontal reducing circuit 111.
Figure 2:
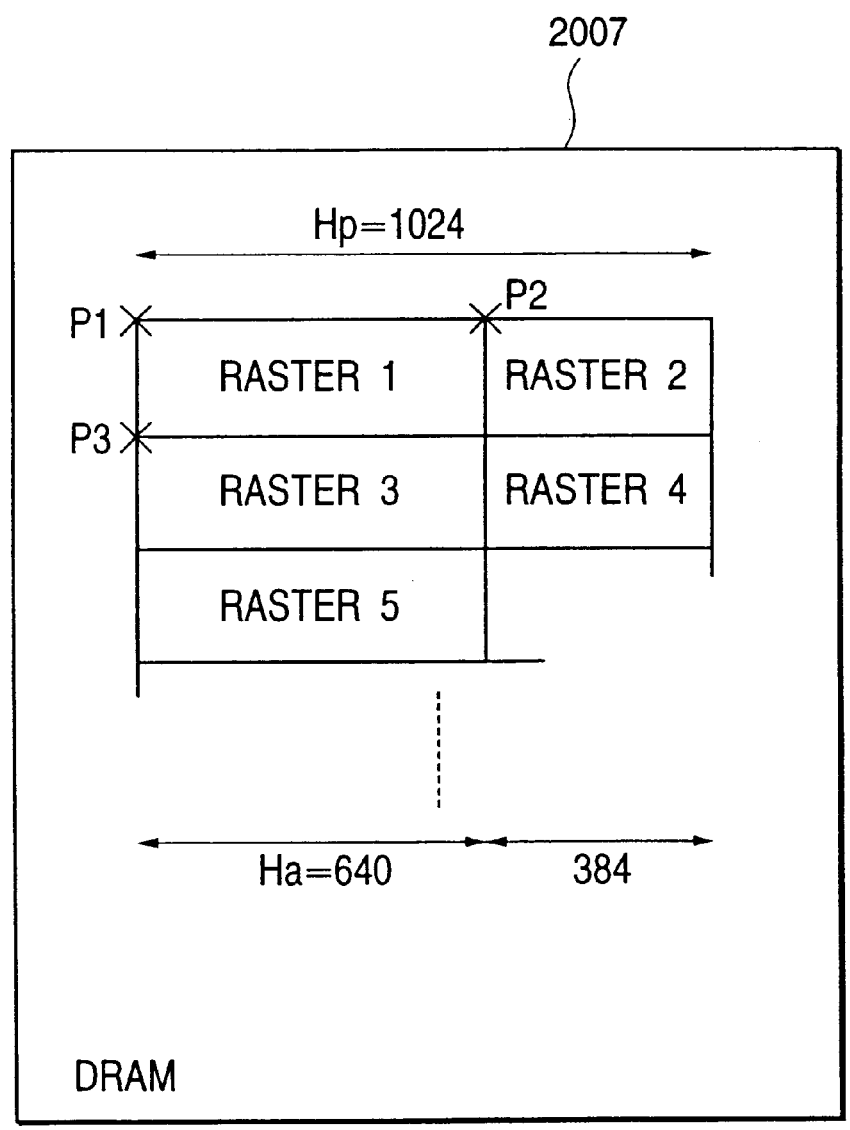
FIG. 2 is a diagram illustrating an operation concept of the conventional image processing apparatus.

FIG. 4 is a detailed block diagram of the horizontal reducing circuit 111. In FIG. 4, reference numerals 201 and 202 represent flip-flops (hereinafter described as FF) constituting a shift register. Reference numeral 203 represents a linear interpolating circuit. An input P is latched by the shift register to obtain $P_i$ and $P_{i+1}$ which are input to the linear interpolating circuit 203 to obtain a reduced output $Q_j$.

Figure 6:
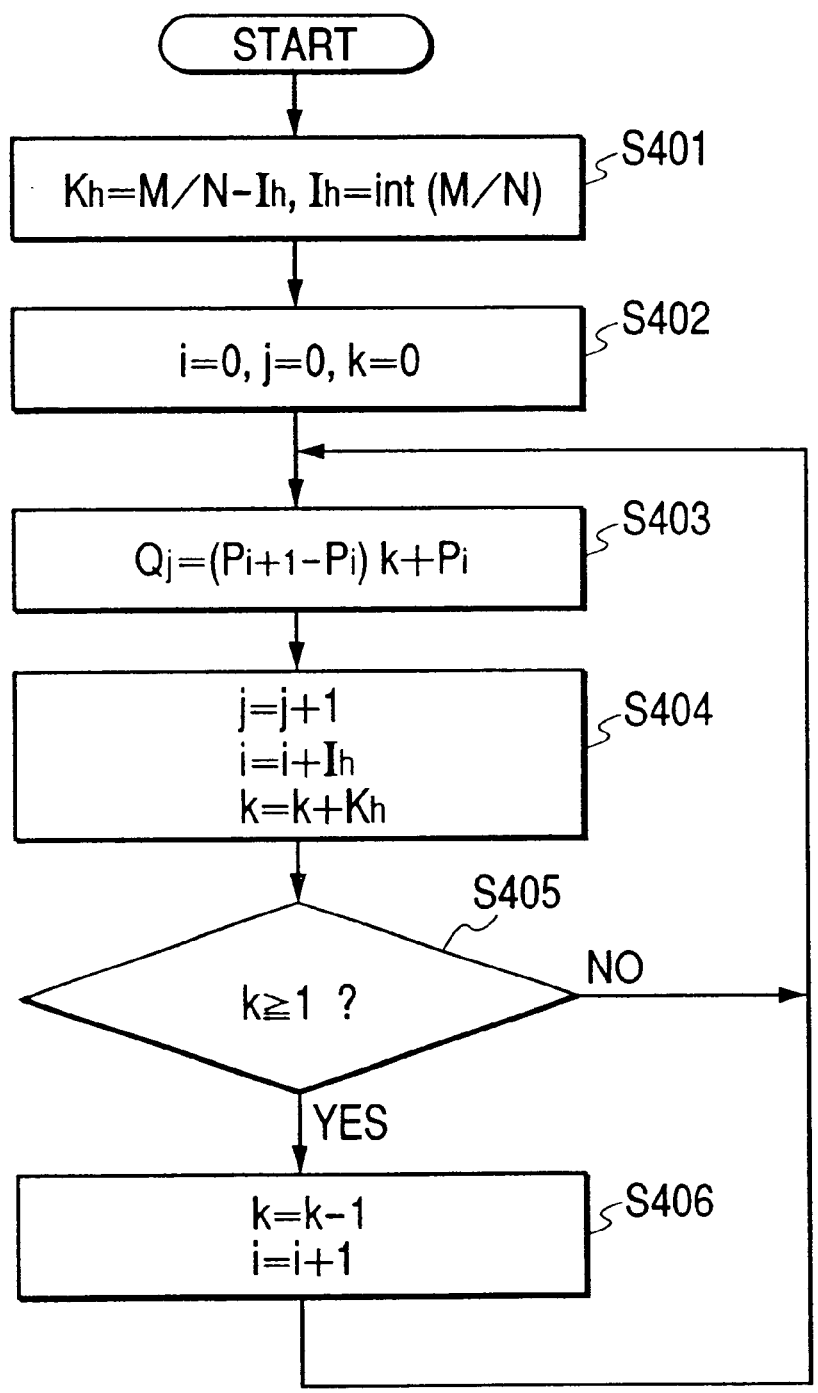
FIG. 6 is a flow chart illustrating a horizontal reducing process of the first embodiment.

FIG. 5 shows an example of a correspondence between an input pixel $P_i$ and an output pixel $Q_j$ at a reduction factor of N/M=3/7. FIG. 6 is a flow chart illustrating the operation of the linear interpolating circuit 203. A reducing operation will be described with reference to FIGS. 5 and 6. First, at Step S401, constants Kh and Ih are set. Kh and Ih once given initial values do not change thereafter. Ih is set to an integer part of int(M/N) of an inverse of a reduction factor ("2" at a factor of 3/7), whereas Kh is set to a fraction part of int(M/N) of an inverse of a reduction factor ("1/3" at a factor of 3/7).

At the next Step S402, an input pixel counter i, an output pixel counter j and an interpolation coefficient k are initialized to "0". At the next Step S403, the following linear interpolating process is performed:

$$Qj=(P_{i+1}-P_i)\times k+P_i \qquad (1)$$

This equation (1) is developed into:

$$Qj=P_{i+1}\times k+P_i\times(1-k) \qquad (2)$$

This is a linear development, and if i=0, j=0 and k=0, then Q0=P0.

Thereafter at Step S404, the output pixel counter j is incremented, Ih is added to the input pixel counter i, and k is added to Kh. Therefore, i=2, j=1 and k=⅓.

At the next Step S405, since k is smaller than "1", the flow branches to a path NO to again perform the linear interpolating process at Step S403. In this process, the following equation is obtained:

$$Q1 = P3 \times \tfrac{1}{3} + P2 \times \tfrac{2}{3} \qquad (3)$$

At the next Step S404, in the manner similar to the above, it stands that i=4, j=2 and k=⅔. The flow again branches to the path NO to perform the linear interpolating process. In this process, the following equation is obtained:

$$Q2 = P5 \times \tfrac{2}{3} + P4 \times \tfrac{1}{3} \qquad (4)$$

At the next Step S404, in the manner similar to the above, it stands that i=6, j=3 and k=1. The flow branches to the path YES. At Step S406 it stands that k=0 and i=7, and the linear interpolating process is performed at Step S403. In this process, it becomes:

$$Q3 = P7 \qquad (5)$$

Thereafter, the reducing process is performed in accordance with similar processes.

Figure 7:
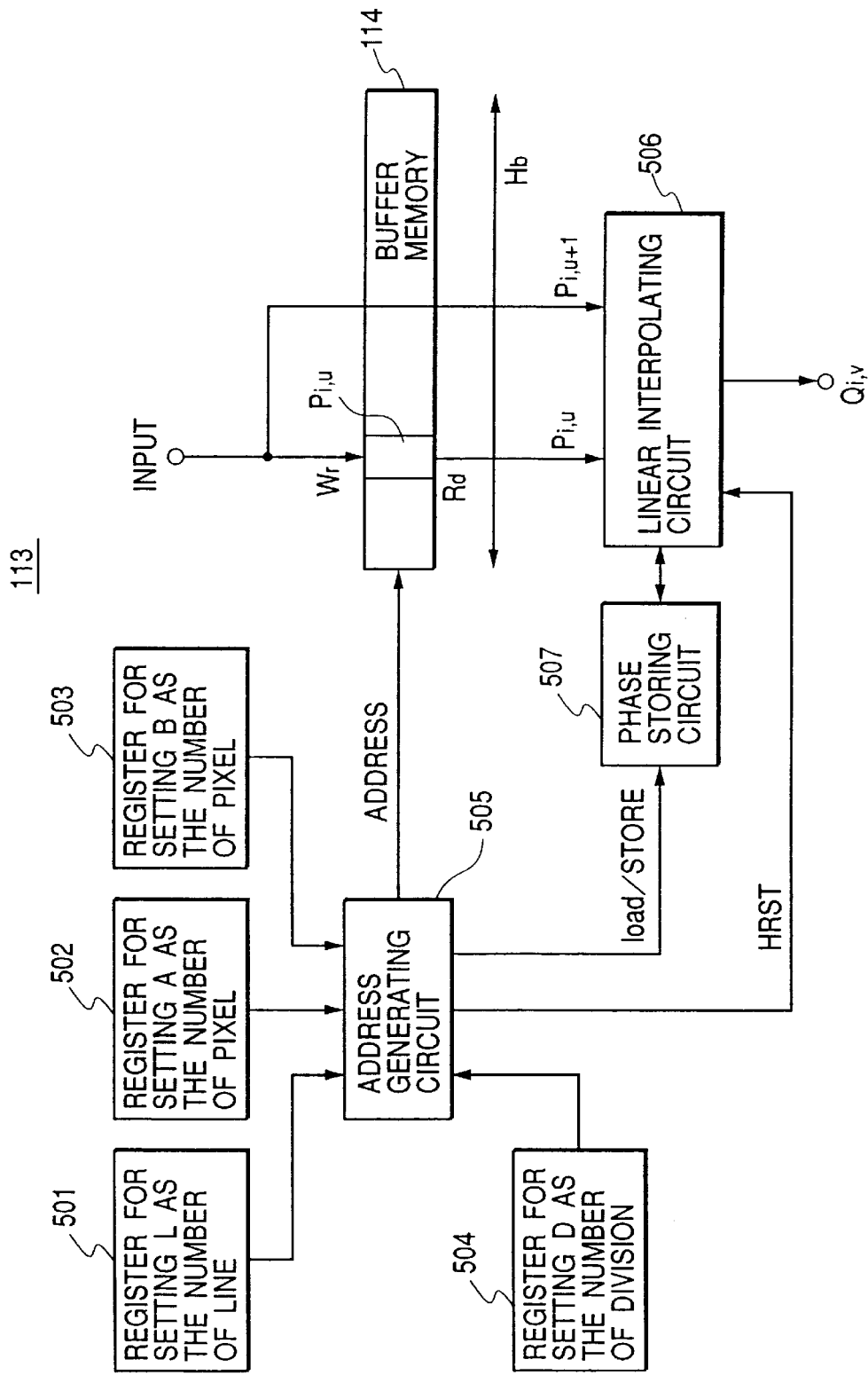
FIG. 7 is a detailed block diagram of a vertical reducing circuit 113.

FIG. 7 is a detailed block diagram of the vertical reducing circuit 113 and its buffer memory 114. In FIG. 7, the buffer memory 114 is a delay line as described earlier having a capacity of Hb words, e.g., one line of horizontal Hb pixels. Reference numeral 505 represents an address generating circuit for generating an address of the buffer memory 114 for the memory access control. Data stored in the buffer memory 114 is read at the address generated by the address generating circuit 505 to obtain image data $P_{i,u}$, and immediately thereafter, input data $P_{i,u+1}$ is written at the same address. The input data $P_{i,u+1}$ is also input at the same time to the linear interpolating circuit 506. Reference numeral 502 represents a register for setting therein the number A of pixels of one line, and reference numeral 503 represents a register for setting therein the number B of pixels of one line. Reference numeral 501 represents a line number L register for setting therein the number of repetition lines, and reference numeral 504 represents a division number D register for setting therein the number of addresses under division management.

The capacity Hb of the buffer memory 114 is related to A, B and D by the following relation:

$$Hb = A \times (D-1) + B \qquad (6)$$

Reference numeral 506 represents a linear interpolating circuit similar to the linear interpolating circuit 203. However, since the vertical reducing circuit 113 operates in a line unit basis, the counter is updated in the line unit basis. Reference numeral 507 represents a phase storing circuit for storing or loading therein as phase information the state of the linear interpolating circuit 506 at a discontinuous point in the vertical scan.

Figure 9:
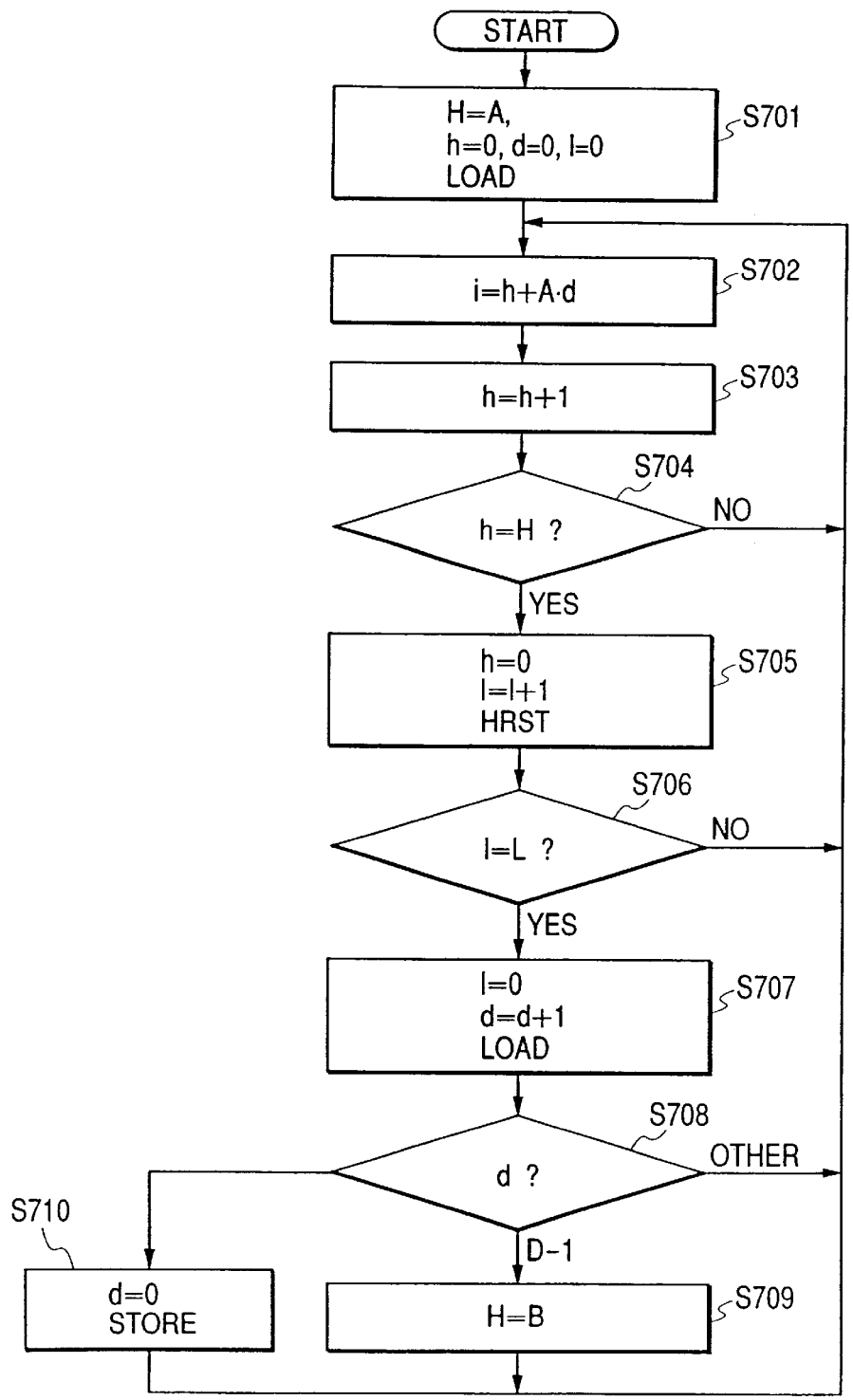
FIG. 9 is a flow chart illustrating an operation of an address generating circuit 505.

FIG. 9 is a flow chart illustrating the operation of the address generating circuit 505. Next, the operation of the address generating circuit 505 will be described with reference to FIG. 9. In FIG. 9, a value set to the line number L register 501 is represented by L, a value set to the pixel number A setting register 502 is represented by A, a value set to the pixel number B setting register 503 is represented by B, and a value set to the division number D register 504 is represented by D. H takes a value of A or B, and h, d and l are variables. h is a pixel count, l is a line count, and d is a division block number count. i is an address output.

First at Step S701, the variables are initialized. Initial phase information is loaded from the phase storing circuit 507 to the linear interpolating circuit 506 to thereafter follow the next Step. At the next Step S702 an address is calculated from h and d and output. At the next Step S703, h is incremented, and after loops are performed at the branch of Step S704 A times, the flow advances to Step S705 whereat the pixel count h is reset, the line count l is incremented, and HRST is asserted to the linear interpolating circuit 506. At the next Step S706, if the line count l is equal to the set value L, processes for one divided block are completed. In this case, at the next Step S707 the line count l is reset and the block count d is incremented. At this time, the phase information is loaded from the phase storing circuit 507 to the linear interpolating circuit 506.

At the next Step S708 if the block count d is equal to the set value D−1, then H=B which means that the number of pixels of one line in the last block is B, whereas if the block count d is equal to D, the block number d is reset and at this time the phase information is stored from the phase storing circuit 507 to the linear interpolating circuit 506. The stored phase information is the load information at the next time.

Figure 8:
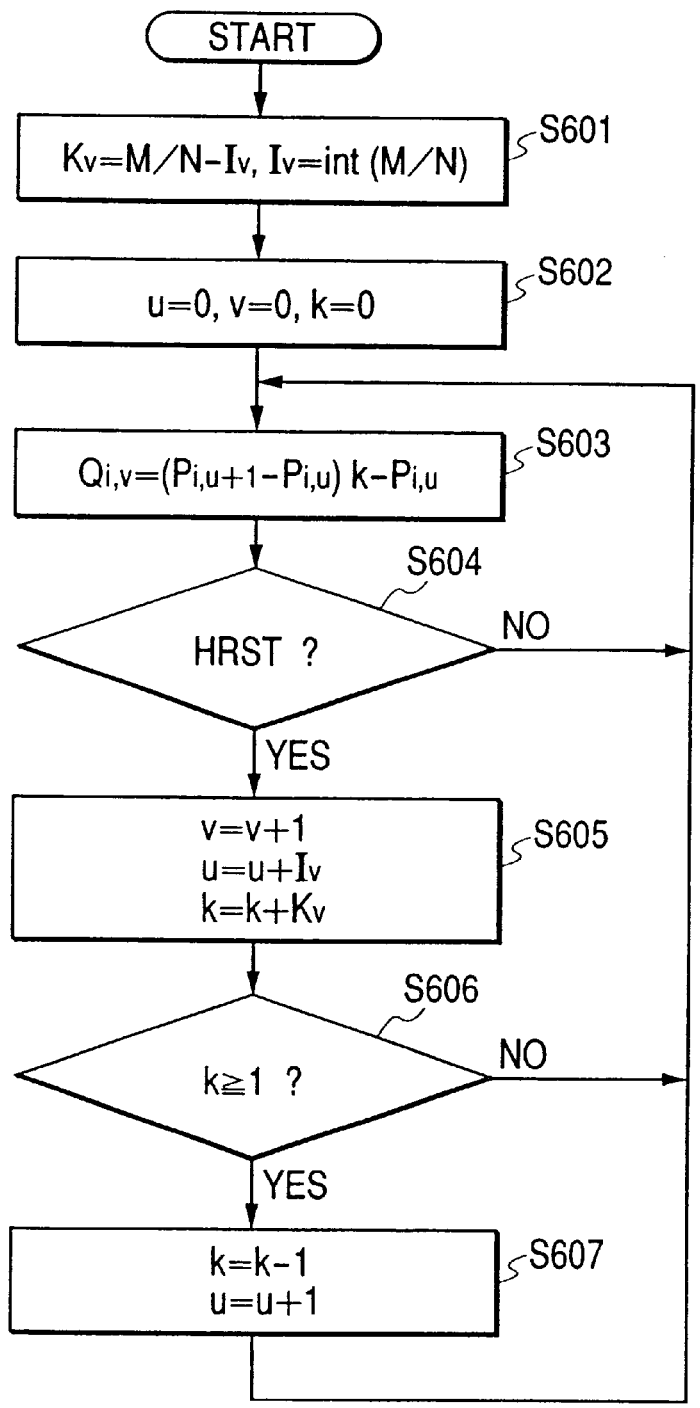
FIG. 8 is a flow chart illustrating a vertical reducing process of the first embodiment.

FIG. 8 is a flow chart illustrating the vertical reducing operation. Different points from the flow chart shown in FIG. 6 reside in that u represents an input pixel counter, v represents an output pixel counter, and i represents an address of the buffer memory 114 which indicates a pixel position in the horizontal direction, the address being managed by the address generating circuit 505 and given as i=h+A×d as shown at Step S702. An end of a line is judged at Step S604 from HRST output from the address generating circuit 505, and by repeating a branch at N, the linear interpolating process of one line is continuously performed. A branch Y at Step S604 is executed when line process is completed. The other processes are the same as those illustrated in FIG. 6.

Loading and storing the phase information of the phase storing circuit 505 is controlled by the address generating circuit. The phase information u, v and k is loaded from the phase storing circuit 50, and conversely stored in the phase storing circuit 50.

Figure 10:
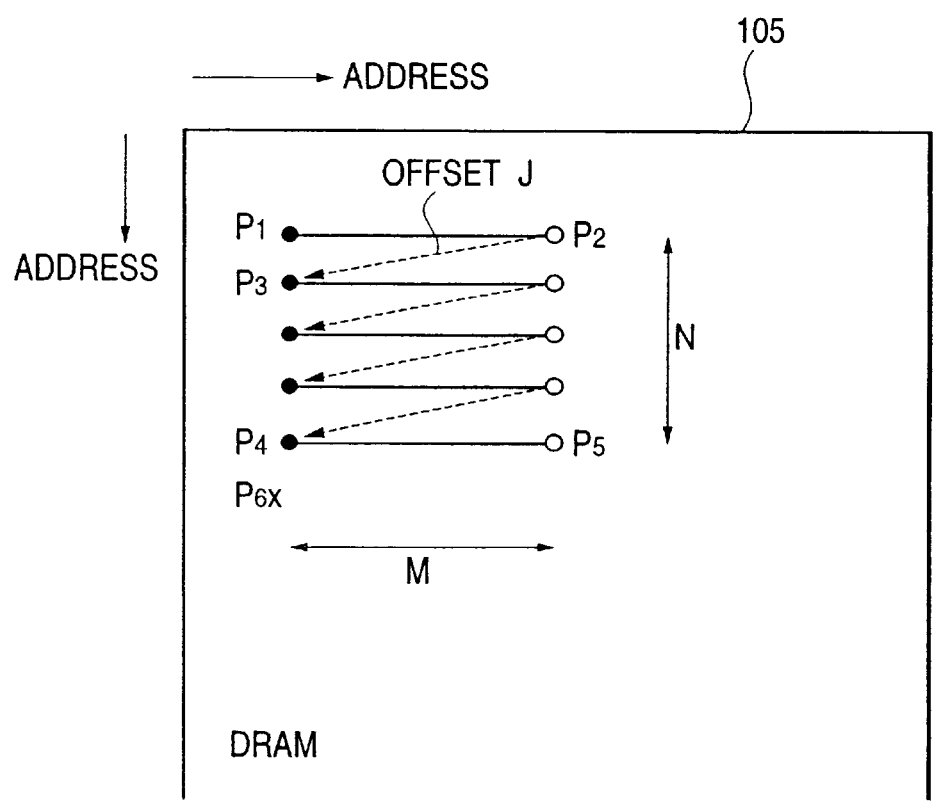
FIG. 10 is a diagram illustrating an operation concept of a DMAC 112.

FIG. 10 is a diagram illustrating an operation concept of DMAC 112. DMAC 112 transfers data in a rectangular area of DRAM 105 by presuming that DRAM 105 has a two-dimensional plane. In FIG. 10, P1, P2, P3, P4, P5 and P6 represent addresses, N represents the number of lines in the rectangular area from which data is transferred, and M represents the number of pixels (Word) of one line. Values of distances J indicated by dot lines all take the same value and are equal to P3−P2. Therefore, DMA of the rectangular area can be realized by repeating DMA of M words starting from a left end pointer, N times.

Figure 11:
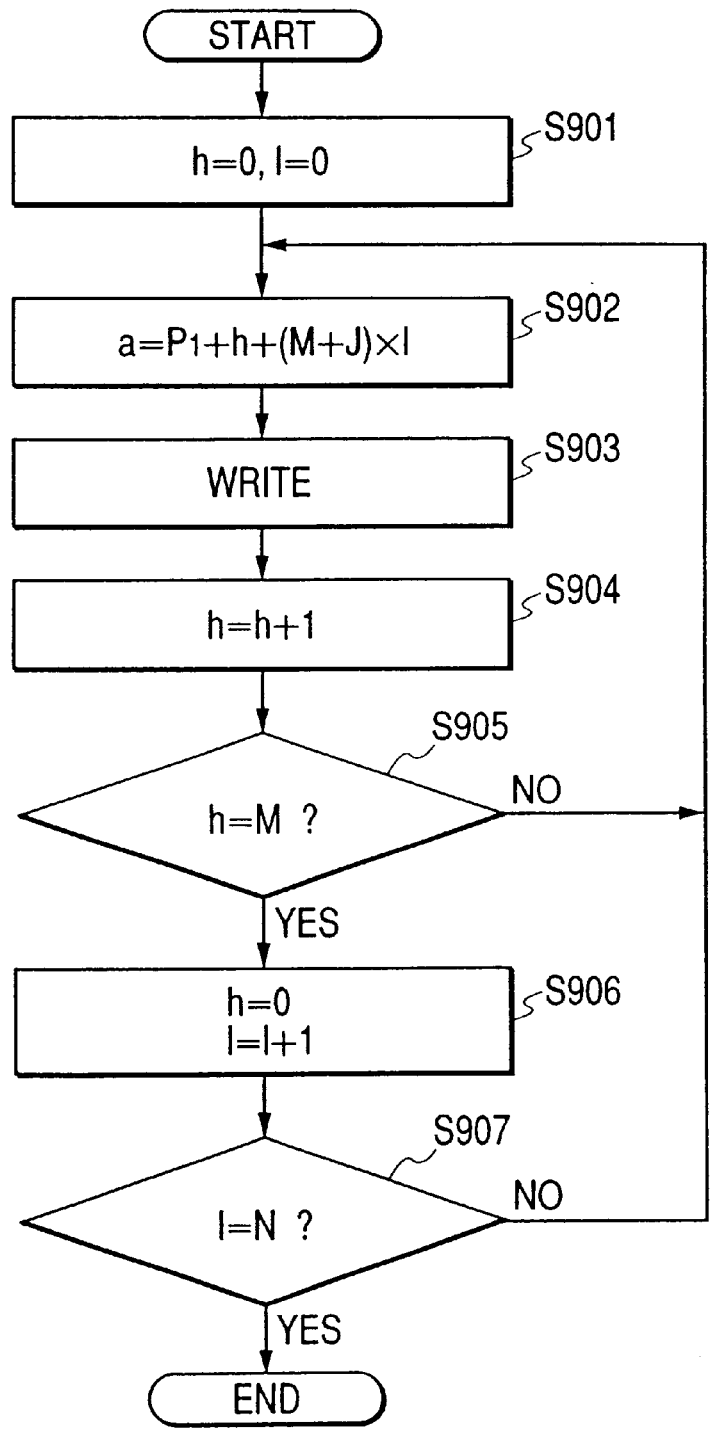
FIG. 11 is a flow chart illustrating an operation of DMAC 112.

FIG. 11 is a flow chart illustrating the operation of two-dimensional DMAC. In FIG. 11, $P_i$, M, N and J correspond to those shown in FIG. 10 and are set to registers of the two-dimensional DMAC 112. First, at Step S901 the counts h and l are reset. At the next Step S902 an address a is calculated from h and v, and at the next Step S903 data is written at the address a. At Step S904, the counter h is incremented, and at Step S905 an end of the line is judged to repeat a branch N and continuously perform the linear interpolating process of one line. When one line process is completed, a branch Y at Step S905 is used.

At Step S906, h is reset and l is incremented. At the next Step S907 the line numbers are compared. If all the lines were transferred, the process is terminated, whereas if not, the flow returns to Step S902 to perform DMA of the next line. With the above processes, two-dimensional DMA can be realized.

Next, the expanding and reproducing operation of the apparatus will be described specifically. Consider now the case wherein the aspect ratio of an original image size of a JPEG compression file is 4:3 having 2048 horizontal pixels and 1536 vertical pixels, image data of YUV422 is reduced to 752×485, the capacity of the buffer memory 110 in the horizontal direction is Ha=320, and the capacity of the buffer memory 114 is Hb=752.

In this case, the reduction factors are:

$752/2048 = 47/128$ in the horizontal direction; and $485/1536 \sim 7/22$ in the vertical direction.

Therefore, Ih and Kh of the horizontal reducing circuit are:

$Ih = int(128/47) = 2$ $Kh = 128/47 - 2 = 34/47$

Iv and Kv of the vertical reducing circuit 113 are:

$Iv = int(22/7) = 3$ $Kv = 22/7 - 3 = 1/7$.

The process unit Ha' of the block/raster converting circuit 109 shown in FIG. 3 is set to 256 in the horizontal direction. This unit is a least common multiple of the denominator "128" of the horizontal reduction factor of $47/128$ and "16 (for YUV 422)" which is the number of pixels of MCU (Minimum Coded Unit) of JPEG data in the horizontal direction, and the unit is also the maximum value of Ha. The line number register 501 shown in FIG. 7 is set with "8 (for YUV 422)" which is the number of pixels of MCU of JPEG data in the vertical direction. The pixel number registers 502 and 503 are set with "94" which is Ha' multiplied by the horizontal reduction factor of $47/128$ and means that 256 pixels are reduced to 94 pixels after the horizontal reduction.

The division number register 504 is set with "8" which is the horizontal size of "2048" of the original image divided by Ha' and rounded up. The initial phase information u, v and k of the phase storing circuit 507 is reset to "0". The register M of the two-dimensional DMAC 112 is set with "94" same as the pixel number register 502 and the like, and the register N is set with "3". The register N is set thereafter with "2" or "3" as the signal processing advances. This is because the value of the vertical reduction factor of $7/22$ multiplied by the vertical process unit of "8" is about 2.5 which means that when eight lines are input, two or three lines are output. The start pointer P1 is set with Pb shown in FIG. 12, and the offset J is set with a proper value.

The operation of the above-described initial settings will be described with reference to FIG. 12. First, CPU 101 reserves an area for JPEG data and an area for reproduction/reduction data in DRAM 105. A JPEG file stored in the recording medium 103 is read and sequentially written in DRAM 105 in the JPEG data area starting from a pointer Pa. DMAC 107 sequentially reads JPEG data starting from the pointer Ps and outputs it to the expansion circuit 108.

The expansion circuit 108 sequentially expands the JPEG data and outputs it to the block/raster converting circuit 109 through block scan. The block/raster converting circuit 109 performs a block/raster conversion in the unit of Ha'×8 words. Therefore, since Ha'=256, when expanded data of 16 MCU's is input, the data is sequentially converted into raster scan data which is output from the block/raster converting circuit 109. The expanded raster scan data of 16 MCU's has 256×8 words, i.e., 8 lines each having 256 pixels.

The raster scan image data is sequentially input to the horizontal reducing circuit 111 to be subject to a horizontal reducing process. The image data is reduced to $256 \times 47/128 =$ 94 pixels per line, and converted into 94 pixels×8 lines to be input to the vertical reducing circuit 113. The vertical reducing circuit 113 processes the image data in accordance with the flow charts shown in FIGS. 8 and 9. Since A and B are set to "94" and D is set to "8", the vertical reducing process is performed while addresses from "0" to "93" of the rectangular image data of 94×8 are generated eight times, and rectangular image data of 94×3 is sequentially output through raster scan. The two-dimensional DMAC 112 transfers the rectangular image data of 94×3 to the rectangular area of 94×3 having Pb as its upper left corner. With the above operations, a process of one divided rectangular area is completed.

Figure 12:
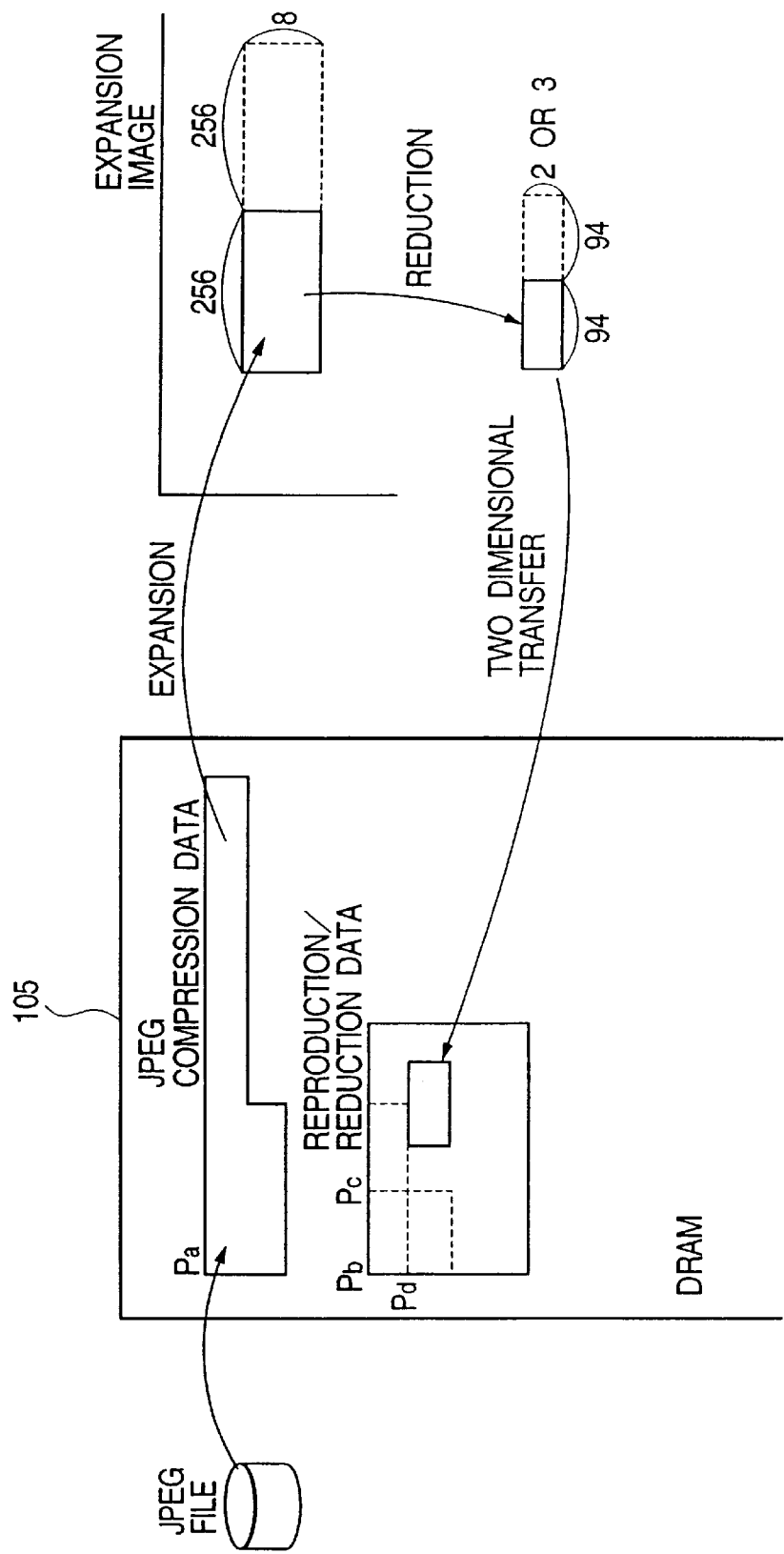
FIG. 12 is a diagram illustrating the outline concept of an image data process of the first embodiment.

In order to process the next rectangular area, the start pointer Pi of the two-dimensional DMAC 112 is then set to Pc shown in FIG. 12. M, N and J are not necessary to be changed. Pc may be set by the two-dimensional DMAC 112 itself as Pb+M. Similar to the first rectangular area process, at the second rectangular area process, the block/raster converting circuit 109 outputs rectangular image data of 256 pixels×8 lines, and the horizontal reducing circuit 111 outputs rectangular image data of 94 pixels×8 lines.

The vertical reducing circuit 113 outputs rectangular image data of 94×3 while addresses of "94" to "187" are generated eight times, and the two-dimensional DMAC 112 transfers the image data to the rectangular area of 94×3 having Pc at its upper left corner. In this manner, the second rectangular area process is completed. Similarly, after the processes up to the eighth rectangular area are completed, the original image of 2048 pixels×8 lines is reduced to the reduced image of 752 pixels×2 lines.

At this time, the phase information u=9, v=3 and k=$3/7$ is stored in the phase storing circuit 507. At the next vertical reducing process, this phase information is first loaded. Also at this time, the buffer memory 114 stores the eighth line of the original image with reduced horizontal pixels of 752 which are used at the next vertical reducing process.

Next, the start pointer Pi of the two-dimensional DMAC 112 is set to Pd shown in FIG. 12 and N is set to "2". Pd may be set by the two-dimensional DMAC 112 itself as Pb+(J+M)×N. At the ninth rectangular area process, similar to the first rectangular area process, the block/raster converting circuit 109 outputs rectangular image data of 256 pixels×8 lines, and the horizontal reducing circuit 111 outputs rectangular image data of 94 pixels×8 lines. The vertical reducing circuit 113 outputs rectangular image data of 94×2 while addresses "0" to "93" are generated eight times, and the two-dimensional DMAC 112 transfers the image data to the rectangular area of 94×2 having Pd at its upper left corner to thus complete the eighth rectangular area process.

Thereafter, similar processes are repeated so that the original image can be processed by dividing it into 8 blocks in the horizontal direction and into 192 blocks in the vertical direction to obtain each of the reproduction/reduction image data having a size of 752 pixels×489 lines. Four lines (489–485) are errors which are adjusted by deleting upper and lower two lines or by not processing the lower four lines.

When each of the reproduction/reduction image data is prepared, the image data of one field is transferred to the reproducing circuit 116 by setting the start pointer of DMAC 115 to Pb shown in FIG. 12, the horizontal pixel number to "752", the vertical line number to "243", and the offset to J×2+752 set to DMAC 112. The reproducing circuit 116 generates video signals through modulation, sync signal addition, DA conversion and the like.

At the next TV field, the start pointer is set to a pointer just under Pb, and the vertical line number is set to "242" to transfer the image data of one field to the reproducing circuit 116. Thereafter, DMA transfer for two fields is repeated. With the above operations, video signals of a full frame having the original aspect ratio of 4:3 can be generated and reproduced for the JPEG expanded data of 2048 pixels× 1536 lines.

The horizontal direction process unit Ha' of the block/raster converting circuit 109 may be set to Ha. Namely, the horizontal direction reduction factor of $47/128$ is approximated to $118/320$. In this case, Ha' is set to "320", the line number register 501 is set to "8 (YUV422)", the pixel number A register 502 is set to "118", and the pixel number B register 503 is set to "47". However, when the divided rectangular area at the right end of the image is processed, Ha' is set to "128".

Further, the division register 504 is set to "7", and the initial phase information u, v and k of the phase storing circuit 507 is reset to "0". The register M of the two-dimensional DMAC 112 is set to "118" same as the pixel number register 502 and the like, and N is set to "3". However, when the divided rectangular area at the right end of the image is processed, M is set to "47" and N is set to "2" or "3" as the signal processing advances.

By performing the division process similar to that described above under the above-described setting, the original image can be processed by dividing it into 7 blocks in the horizontal direction and into 192 blocks in the vertical direction, to thereby obtain each of the reproduction/reduction image data having a size of 756 pixels×489 lines. In this case, the capacity Hb of the buffer memory 114 is required to be 756 pixels or larger. Four error pixels in the horizontal direction and four error pixels in the vertical direction are adjusted after the reducing process.

Figure 13:
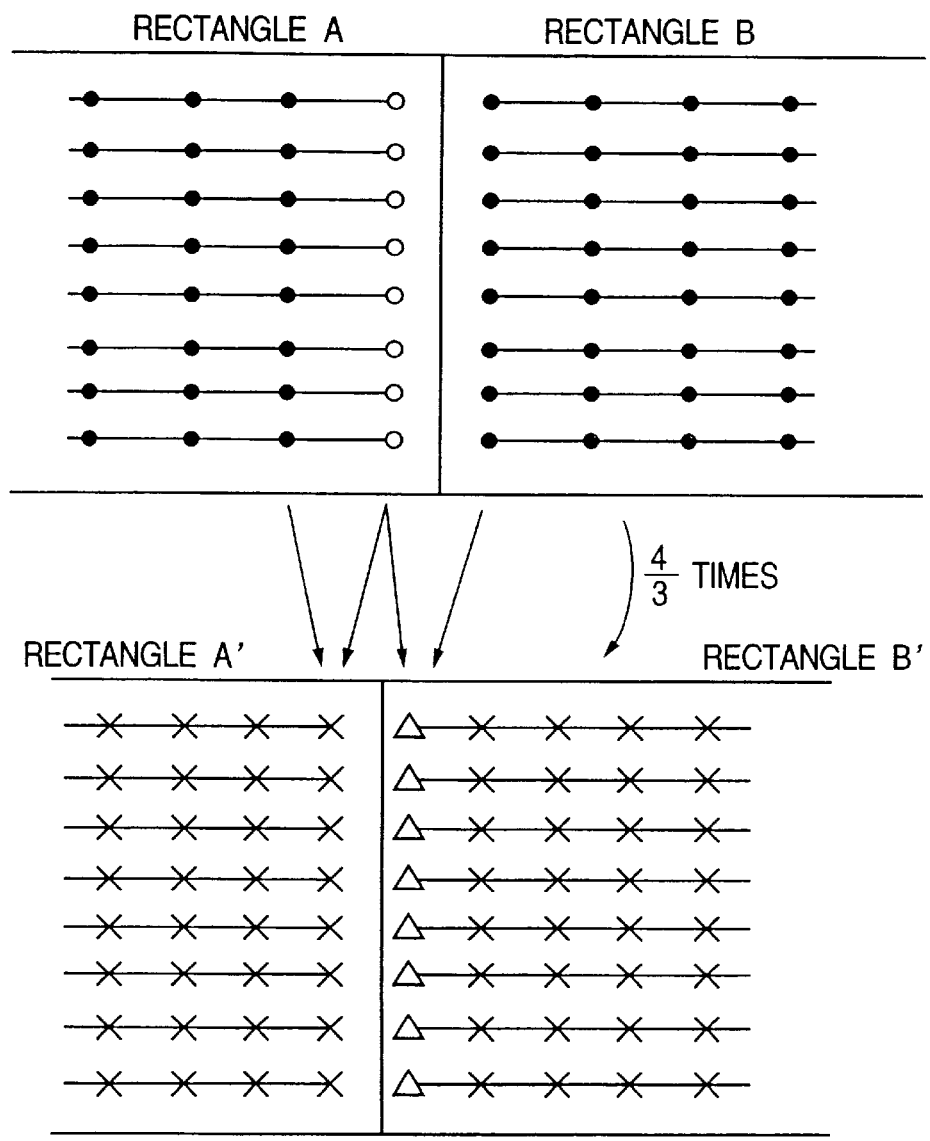
FIG. 13 is a diagram illustrating a concept of horizontal expansion in a division process of the embodiment.

By slightly modifying the horizontal reducing circuit 111, a horizontal expanding and reducing circuit can be realized. FIG. 13 is a diagram illustrating a concept of expanding image data by $4/3$ in the horizontal direction. In FIG. 13, when the block/raster conversion is performed by dividing image data into a rectangular area A and a rectangular area B, rectangular areas A' and B' are areas after the expanding process. Pixels represented by a triangle in the rectangular area B' cannot be interpolated unless both the rectangular areas A and B are referred to. It is therefore necessary to store the value of each pixel represented by a blank circle in the rectangular area A and its interpolation coefficient Kh until the rectangular area B is processed.

Figure 14:
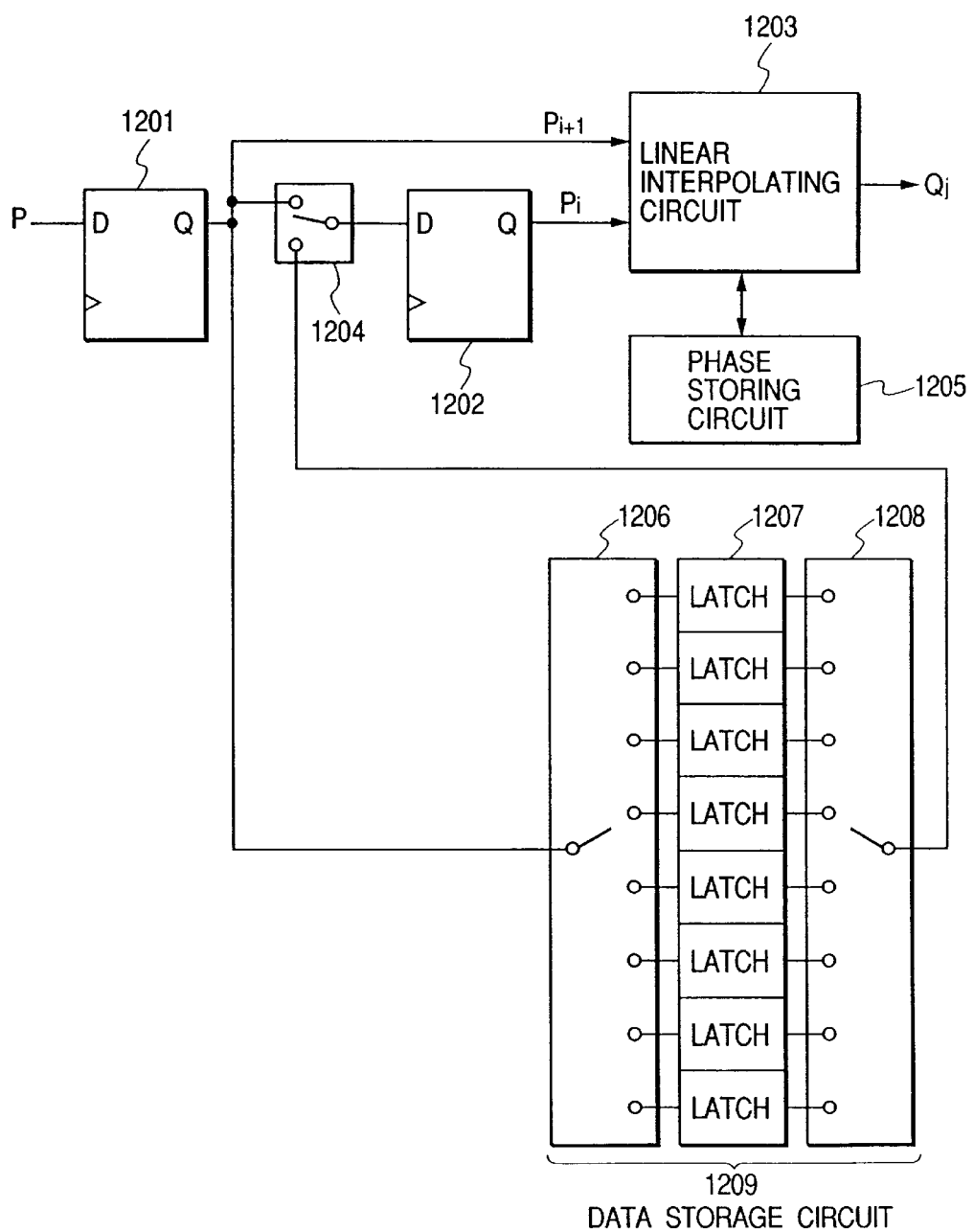
FIG. 14 is a detailed block diagram of a horizontal expanding and reducing circuit.

FIG. 14 is a detailed block diagram of a horizontal expanding and reducing circuit realizing the process illustrated in FIG. 13. In FIG. 14, reference numeral 1203 represents a linear interpolating circuit whose operation is the same as that illustrated in the flow chart of FIG. 6. However, in the expansion process, Ih is always "0". Reference numerals 1201 and 1202 represent FF's. Reference numeral 1206 represents a 1:8 selector, reference numeral 1208 represents an 8:1 selector, and reference numeral 1207 represents a latch, these elements constituting a data storing circuit 1209. Reference numeral 1204 represents a selector for switching between an ordinary data flow and a data load from the data storing circuit 1209, and reference numeral 1205 represents a phase storing circuit for loading or storing the interpolation coefficient Kh of the linear interpolating circuit 1203.

Data indicated by the blank circles in FIG. 13 is sequentially stored in the latch 1207 by controlling the selector 1206, Kh of the data indicated by the blanc circle on the lowest line is stored in the phase storing circuit 1205, and Kh is loaded to the linear interpolating circuit 1203 at the start of each line of the rectangular area B. Data indicated by the blank circles can be loaded and the horizontal expanding process can be performed by selecting the data storing circuit 1209 by the selector 1204 and properly selecting the selector 1208.

Figure 16:
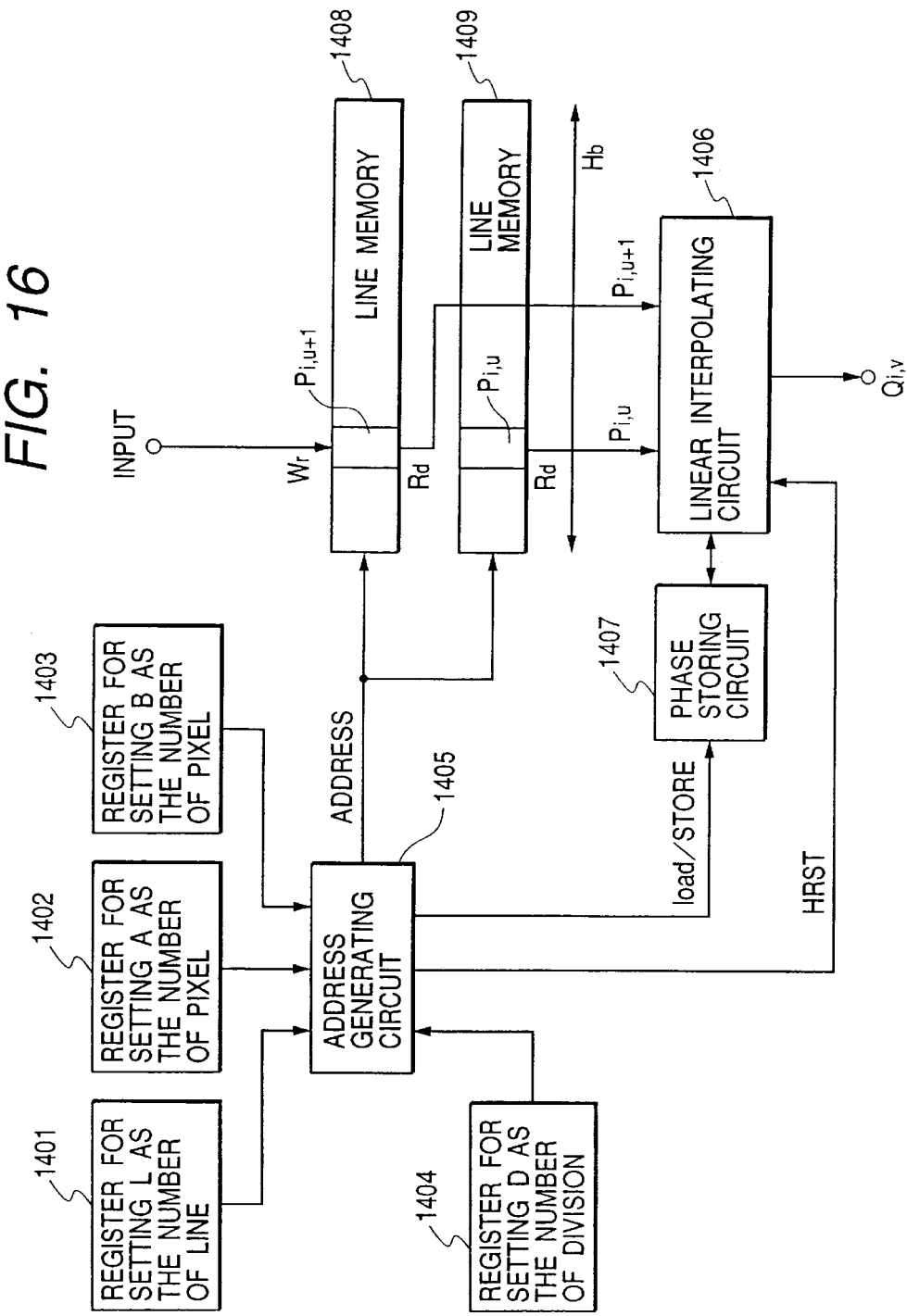
FIG. 16 is a detailed block diagram of a vertical expanding and reducing circuit.

If the capacity of the buffer memory 114 is doubled, a vertical expanding and reducing circuit can be realized. FIG. 16 is a detailed block diagram of a vertical expanding and reducing circuit. In FIG. 16, reference numerals 1408 and 1409 represent a line memory of Hb words. The other structures are the same as those of the circuit shown in FIG. 7. The operation of an address generating circuit 1405 is the same as that illustrated by the flow chart shown in FIG. 9, and the operation of a linear interpolating circuit 1406 is the same as that illustrated by the flow chart shown in FIG. 8. However, in the expansion process, Ih is always "0", and L of a line number register 1401 is set to the output line number not to the input line number. An input is written in only one of the line memories, and only read data of the line memory is input to the linear interpolating circuit 1406. The line memories 1408 and 1409 are swapped by HRST. The other operations are similar to the vertical reducing circuit 113.

Figure 15:
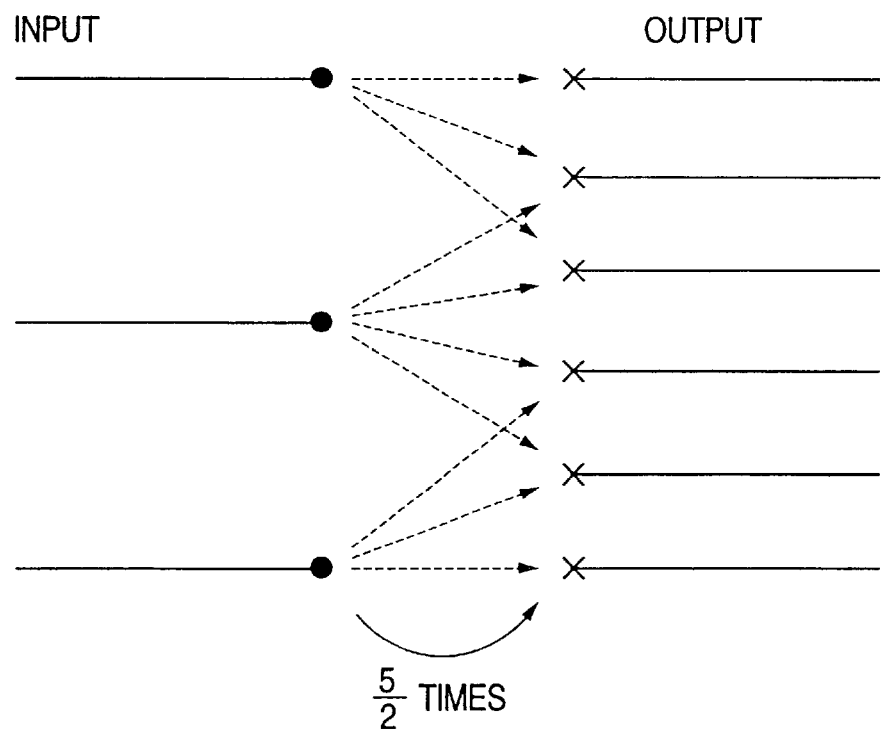
FIG. 15 is a diagram illustrating a concept of vertical expansion in the division process of the embodiment.

FIG. 15 is a diagram illustrating a concept of enlarging image data by $5/2$ in the vertical direction. For example, the output second and third lines can be interpolated by both the input first and second lines. Therefore, for the vertical expanding process and raster output, it is necessary to provide input line buffers of two lines. In such a case, the address generating circuit 1405 disables a data write of the third input line to the buffer memory 1408 and performs data read only from the two line memories. Therefore, in the example shown in FIG. 15, address scan is repeated six times to realize the vertical expanding process.

Figure 17:
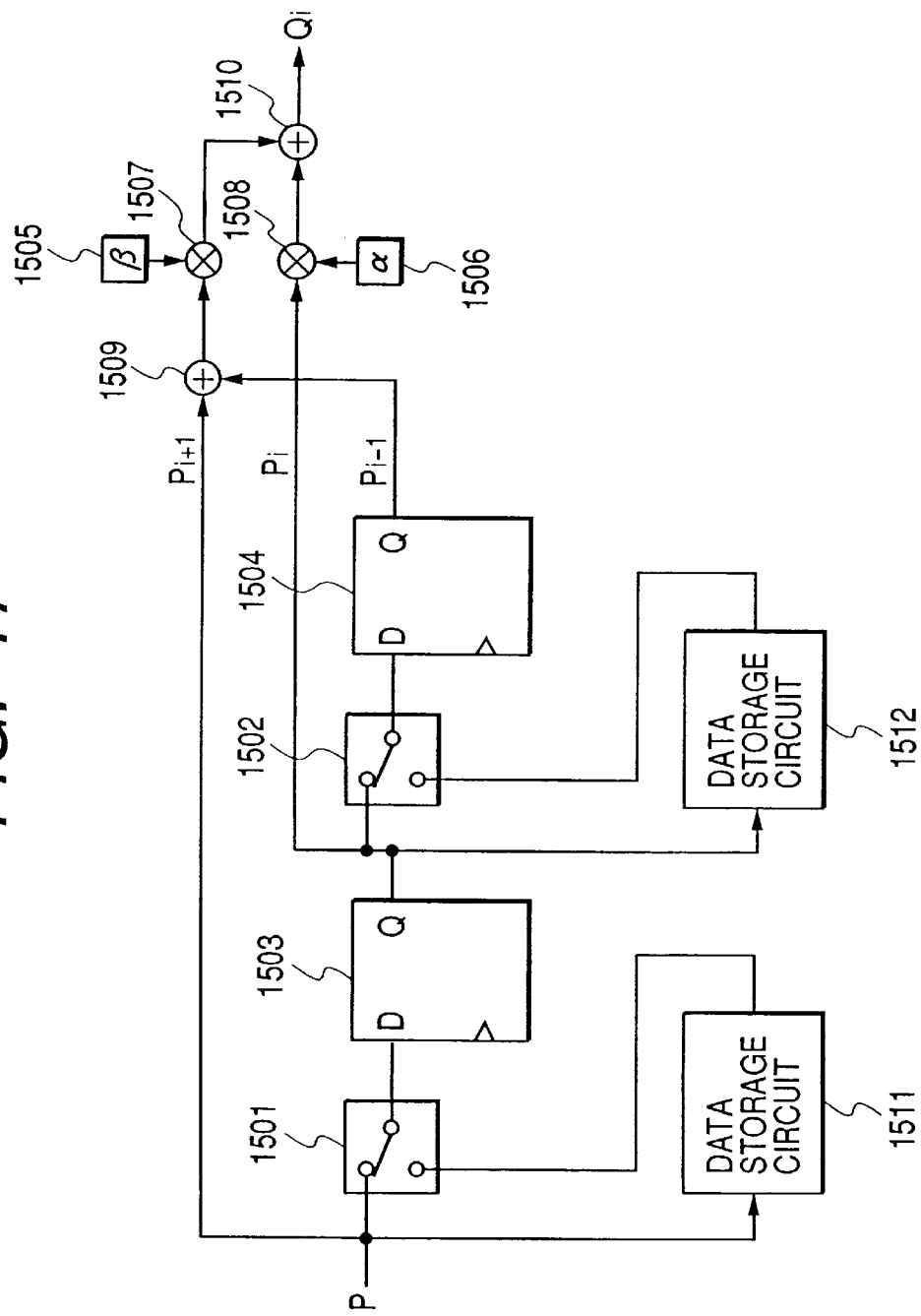
FIG. 17 is a block diagram of a horizontal expanding and reducing circuit with a horizontal LPF circuit.

By inserting a LPF (Low Pass Filter) into an expanding and reducing circuit, it is possible to obtain a good expanded or reduced image with less aliasing. FIG. 17 shows an example of a horizontal LPF circuit. In FIG. 17, reference numerals 1503 and 1504 represent FF's, reference numerals 1501 and 1502 represent switches, reference numerals 1505 and 1506 represent registers for storing α and β which determine the characteristics of LPF, reference numerals 1507 and 1508 represent multiplies, and reference numerals 1509 and 1510 represent adders. By setting α and β, a filter can be realized providing a filter coefficient "121", "111", "101" or the like.

The registers 1505 and multipliers 1507 and 1508 may be configured by a combination of shift and addition or the like. For example, assuming that α=0.5 and β=0.25, the filter has an output of:

$$0.25 \times P_{i-1} + 0.5 \times P_i + 0.25 \times P_{i+1}$$

and a filter coefficient of "¼, ½, ¼".

Reference numerals 1511 and 1512 represent data storing circuits. The data storing circuit 1512 stores data of eight pixels at the right end at the boundary of divided rectangular areas similar to the data storing circuit 1209, whereas the data storing circuit 1511 stores data of eight pixels one pixel before that at the right end. When the right rectangular area is processed, the data is loaded at the start of each line by using the switches 1501 and 1502. With the above operations, even at the boundary of divided rectangular areas, an output does not become discontinuous and the frequency band can be limited.

Figure 18:
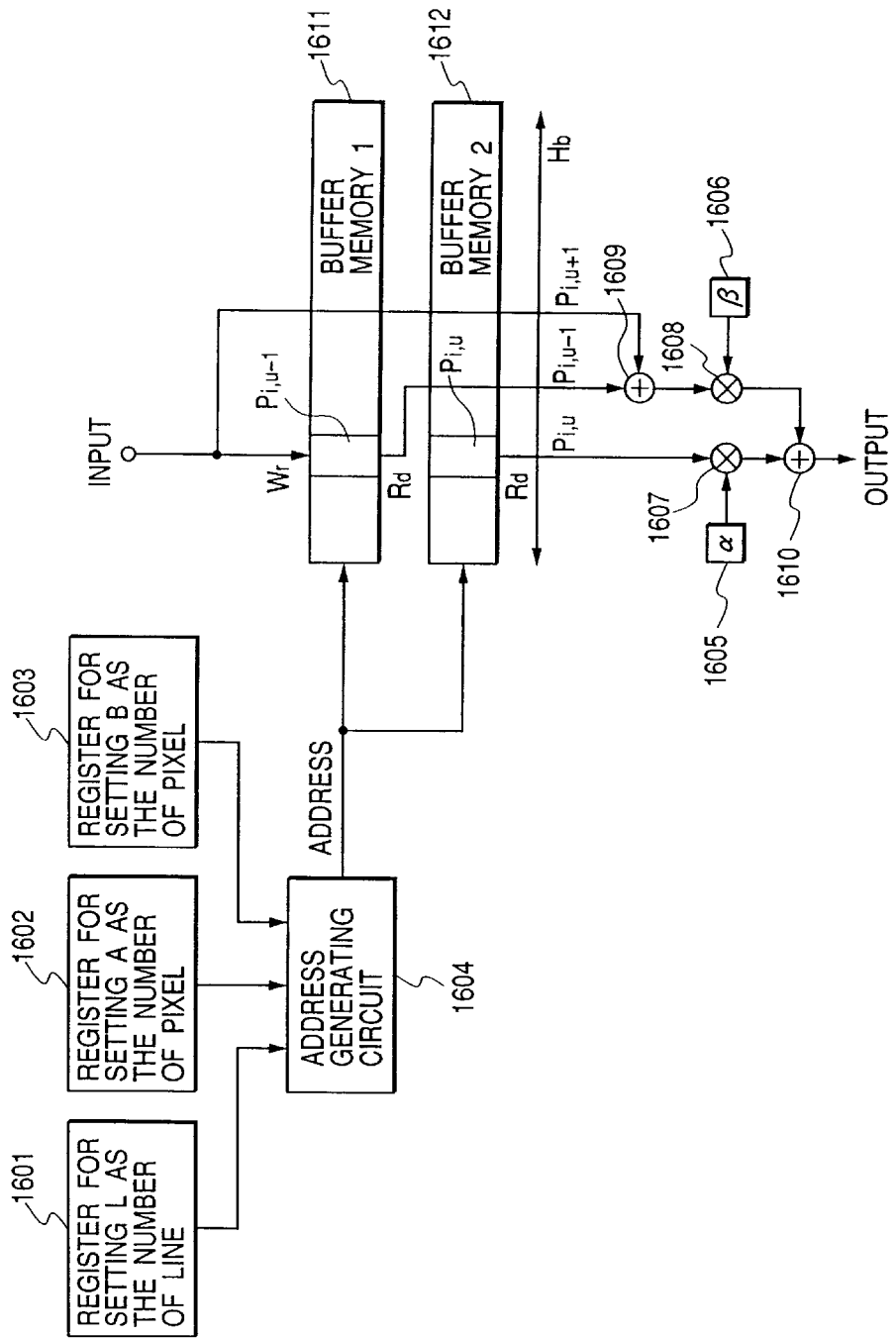
FIG. 18 is a block diagram of a vertical expanding and reducing circuit with a vertical LPF circuit.

FIG. 18 shows an example of a vertical LPF circuit. In FIG. 18, reference numeral 1604 represents an address generating circuit, reference numeral 1601 represents a line number register, and reference numerals 1602 and 1603 represent pixel number registers, these components being similar to those shown in FIG. 7. Reference numerals 1605 and 1606 represent registers for storing $\alpha$ and $\beta$ which determine the characteristics of LPF, reference numerals 1607 and 1608 represent multiplies, and reference numerals 1609 and 1110 represent adders. By setting $\alpha$ and $\beta$, a filter can be realized providing a filter coefficient "121", "111", "101" or the like. The registers 1605 and multipliers 1607 and 1608 may be configured by a combination of shift and addition or the like.

Reference numerals 1611 and 1612 represent buffer memories corresponding to the buffer memory 114, the buffer memory operating as a delay line having a capacity of Hb×2 words, i.e., two lines of horizontal Hb pixels, ad described earlier. Data in the buffer memory 1611 is read at the address generated by the address generating circuit 1604 to obtain image data $P_{i,u-1}$ and immediately thereafter input data $P_{i,u-1}$ is written at the same address.

Data in the buffer memory 1612 is read at the address generated by the address generating circuit 1604 to obtain image data $P_{i,u-1}$. For example, assuming that $\alpha=0.5$ and $\beta=0.25$, the filter has an output of:

$$0.25 \times P_{i,u-1} + 0.5 \times P_{i,u} + 0.25 \times P_{i,u+1}$$

and a filter coefficient of "¼, ½, ¼".

When the address generating circuit 1604 generates HRST corresponding to Step S705 shown in FIG. 9, the buffer memories 1611 and 1612 are swapped to exchange the data channels. By this swapping, the filtering with the same coefficients can be performed even at the next line by using a similar data flow control.

In this embodiment, although linear interpolation is used as an interpolating method, a cubic interpolating method may also be used.

(Second Embodiment)

Next, the second embodiment will be described.

Figure 19:
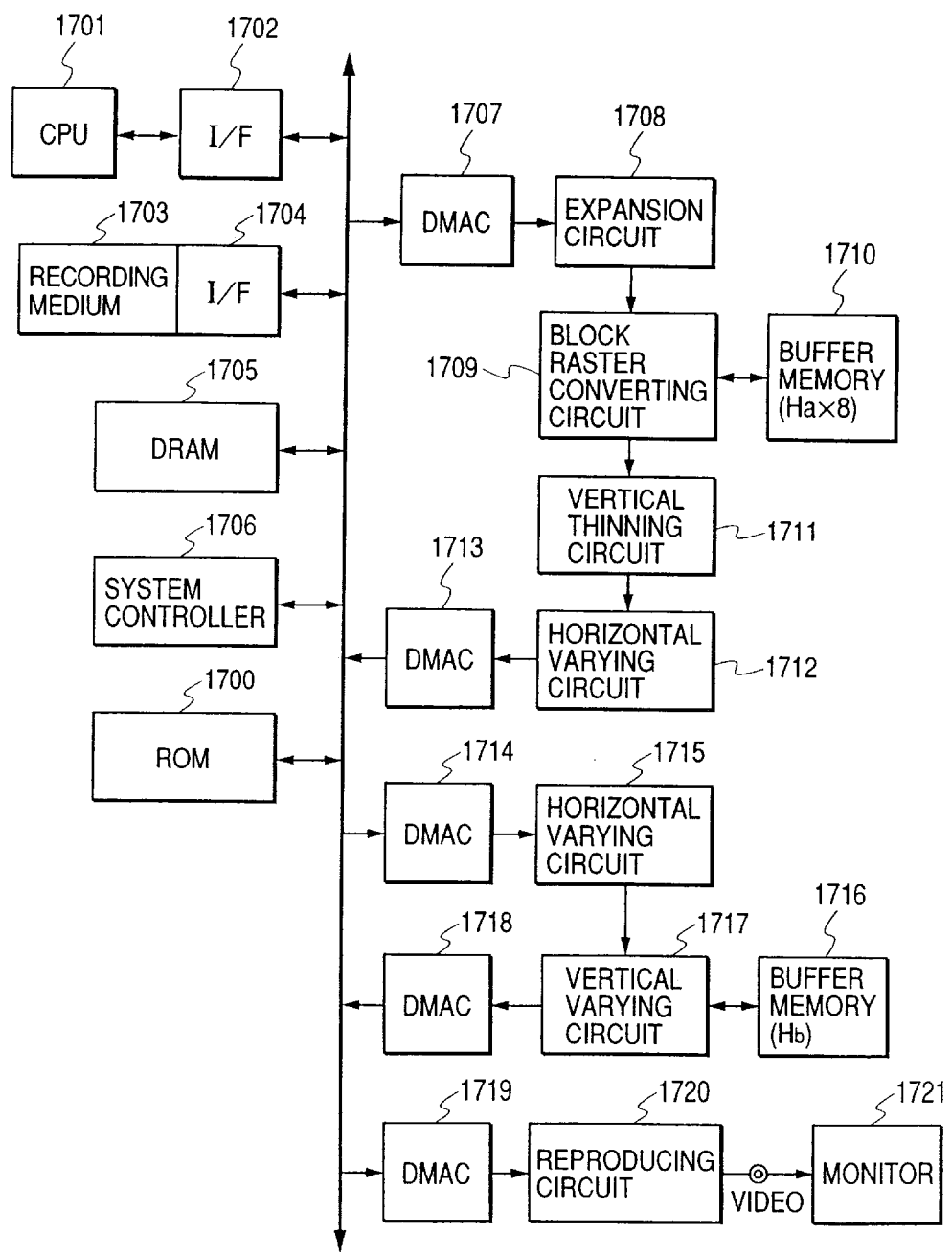
FIG. 19 is a block diagram showing the structure of an image processing apparatus according to a second embodiment of the invention.

FIG. 19 is a block diagram of an image processing apparatus according to the second embodiment of the invention. In FIG. 19, reference numeral 1701 represents a CPU (Central Processor Unit) for controlling the whole system, reference numeral 1702 represents an interface circuit of CPU 1701, reference numeral 1703 represents a recording medium such as a memory card, reference numeral 1704 represents an interface circuit of the recording medium 1703, reference numeral 1705 represents a DRAM for storing image data, and reference numeral 1706 represents a system controller for system sequential control, bus arbitration control and the like.

Reference numeral 1708 represents a known expansion circuit for expanding JPEG data on a block unit basis, reference numeral 1707 represents a direct memory access controller (hereinafter described as DMAC) for transferring data in DRAM 1705 to the expansion circuit 1708, reference numeral 1709 represents a block/raster converting circuit for converting block scan image data expanded by the expansion circuit 1708 into raster scan image data, and reference numeral 1710 represents a buffer memory for block/raster conversion having a capacity of Ha×8 words. The block/raster converting circuit 1709 can therefore convert block scan data up to the horizontal pixels Ha into raster scan data at a time.

Reference numeral 1711 represents a vertical thinning circuit for thinning image data at an arbitrary integer ratio in the vertical direction, and reference numeral 1712 represents a horizontal varying circuit for varying image data at an arbitrary variation factor in the horizontal direction through linear interpolation or the like, the operation of the horizontal varying circuit being the same as that illustrated in the flow chart shown in FIG. 6. Reference numeral 1713 represents a DMAC for two-dimensionally DMA transferring an output of the horizontal varying circuit 1712 to DRAM 1705, the operation of DMAC 1713 being similar to that of DMAC 112 shown in FIG. 3. Reference numeral 1715 represents a horizontal varying circuit for varying image data in the horizontal direction through linear interpolation or the like, the operation of the horizontal varying circuit being the same as that illustrated in the flow chart shown in FIG. 6.

Reference numeral 1717 represents a vertical varying circuit for varying image data in the vertical direction through linear interpolation or the like, the vertical varying circuit being similar to the vertical reducing circuit 113 shown in FIG. 3. However, since this vertical varying circuit 1717 is not necessary to perform a division process, it is not necessary to use the pixel number register 503, division number register 504, and phase storing circuit 507 shown in FIG. 7. Reference numeral 1716 represents a buffer memory for the vertical varying circuit 1717, the buffer memory 1716 operating as a delay line of Hb words, i.e., one line of horizontal pixels Hb. Reference numeral 1718 represents a DMAC for transferring an output of the vertical varying circuit to DRAM 1705. Reference numeral 1719 represents a DMAC for transferring image data in DRAM 1705 to a reproducing circuit 1720. The reproducing circuit 1720 generates a video signal from image data through modulation, sync signal addition, DA conversion and the like. Reference numeral 1721 represents a monitor for displaying the video signal reproduced by the reproducing circuit 1720. Reference numeral 1700 represents a ROM for storing programs to be executed by CPU 1701 and being constituted in the manner similar to ROM 100 shown in FIG. 3.

Figure 20:
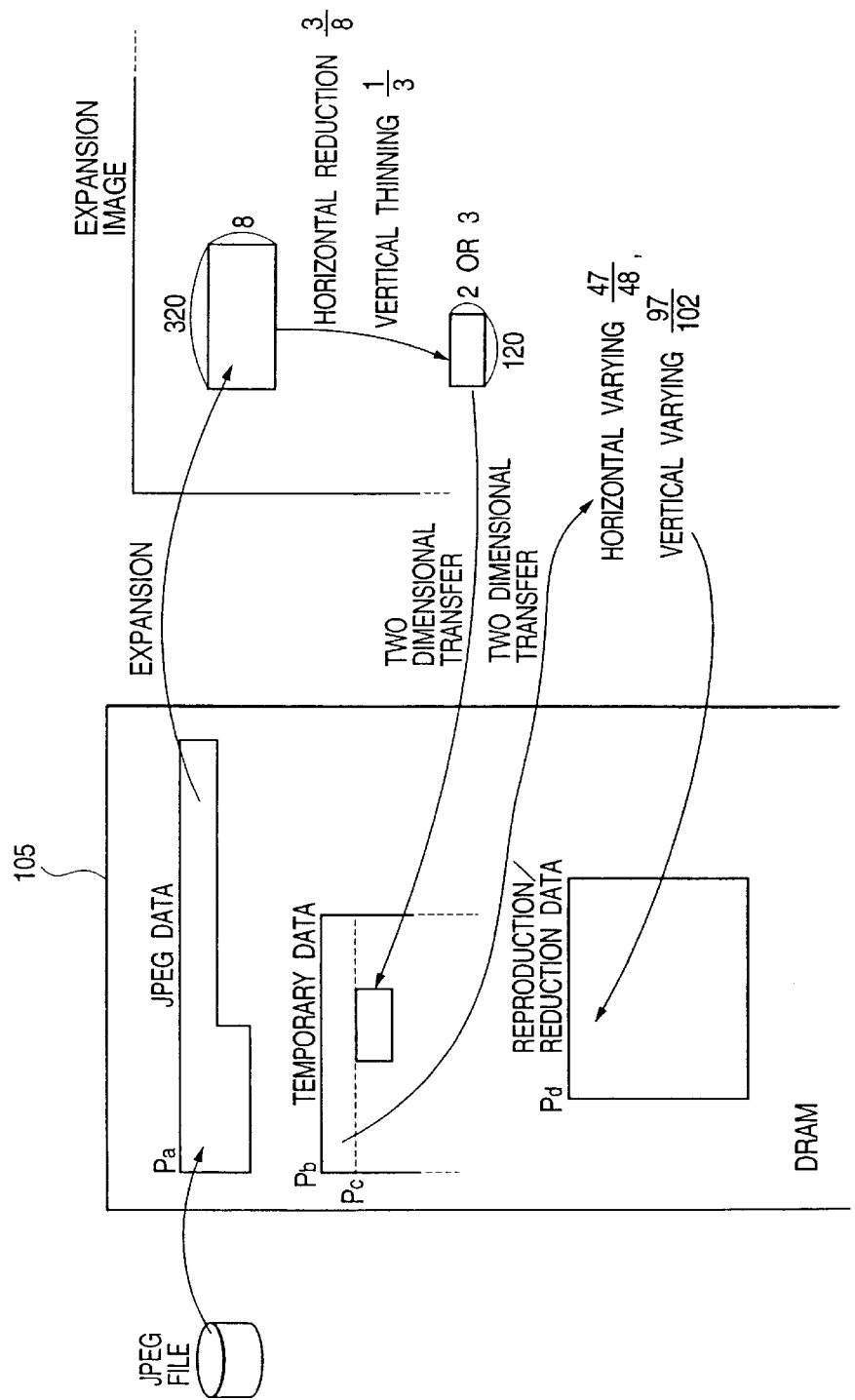
FIG. 20 is a diagram illustrating the outline concept of an image data process of the second embodiment.

FIG. 20 is a diagram illustrating an operation concept of the second embodiment. An expanding and reproducing operation will be described with reference to FIG. 18. Consider now the case wherein the aspect ratio of an original image size of a JPEG compression file is 4:3 having 2048 horizontal pixels and 1536 vertical pixels, image data of YUV422 is reduced to 752×485, the capacity of the buffer memory 1710 in the horizontal direction is Ha=320, and the capacity of the buffer memory 1714 is Hb=752. In this case, the process unit Ha' of the block/raster converting circuit 1709 is set to "320" in the horizontal direction, a thinning factor of the vertical thinning circuit 1711 is set to ⅓, a variation factor of the horizontal varying circuit 1712 is set to ⅜, a variation factor of the horizontal varying circuit 1715 is set to $^{47}/_{48}$, and a variation factor of the vertical varying circuit 1717 is set to $^{97}/_{102}$.

First, CPU 1701 reserves a memory area for JPEG data and a memory area for reproduction/reduction data in DRAM 1705. A temporary memory area is reserved and released when necessary as the signal processing progresses. A JPEG file stored in the recording medium 1703 is read and sequentially written in DRAM 1705 in the JPEG data area starting from a pointer Pa. DMAC 1707 sequentially reads JPEG data starting from the pointer Ps and outputs it to the expansion circuit 1708. The expansion circuit 1708 sequentially expands the JPEG data and outputs it to the block/raster converting circuit 1709 through block scan.

The block/raster converting circuit 1709 performs a block/raster conversion in the unit of 320×8 words, and outputs raster scan image data in a rectangular area of 320 pixels×8 lines to the vertical thinning circuit 1711. Considering the vertical phase of a whole virtual expansion image, the vertical thinning circuit 1711 thins the vertical eight lines by two or three lines at the thinning factor of ⅓ and outputs the result to the vertical varying circuit 1712. The vertical varying circuit 1712 reduces 320 horizontal pixels by ⅜ and outputs reduced image data of 120 pixels×2 (or 3 lines) to DMAC 1713.

DMAC 1713 transfers the reduced image data of 120 pixels×2 (or 3 lines) to the temporary data area through two-dimensional DMA. As the temporary data area, a double buffer of 768 pixels×3 lines×2 is reserved. After the data transfer is completed to one buffer of 768×3 lines, the data in this buffer area is two-dimensionally read by DMAC 1714 and transferred to the horizontal varying circuit 1715. The horizontal varying circuit 1715 reduces the image data of 786 pixels per line by $47/48$ to 752 pixels per line and outputs it to the vertical varying circuit 1717. The vertical varying circuit 1717 reduces the image data by $97/102$ in the vertical direction and outputs it to DMAC 1718. DMAC 1718 sequentially DMA transfers the image data starting from the pointer Pd. This transfer is not necessarily two-dimensional DMA.

After all the expansion and reduction processes are completed, a reduced image of 752×487 can be obtained. The two error lines in the vertical direction are adjusted by deleting the upper one line and lower one line are deleted or by not performing the signal processing for the lower two lines. DMAC 1719 sequentially transfers for each TV field the image data starting from the pointer Pd to the reproducing circuit 1720 through two-dimensional DMA. The reproducing circuit 1720 generates a video signal from image data through modulation, sync signal addition, DA conversion and the like. With the above operations, video signals of a full frame having the original aspect ratio of 4:3 can be generated and reproduced for the JPEG expanded data of 2048 pixels×1536 lines.

If the temporary data area has 768 pixels×8 lines×2, the vertical thinning circuit 1711 can be omitted. In this case, the variation factor of the vertical varying circuit 1717 is set to $7/22$. Although the above operations are related to a reduction process, a vertical expansion process can be performed by using the buffer memory 1716 of one line and repeating one line transfer by DMAC 1714.

A performance of a horizontal expansion process can be improved by using the horizontal varying circuit 1715 without using the horizontal varying circuit 1712. In this case, since the division process is not performed, the horizontal varying circuit 1715 does not require the phase storing circuit, data storing circuit and the like. In this embodiment, although a LPF circuit is not provided at the preceding stage of the varying circuit, a LPF circuit may be inserted so that an image having less aliasing can be obtained. Further, although the linear interpolation is used as the interpolating method, a cubic interpolating method may also be used.

(Third Embodiment)

Next, the third embodiment will be described.

Figure 21:
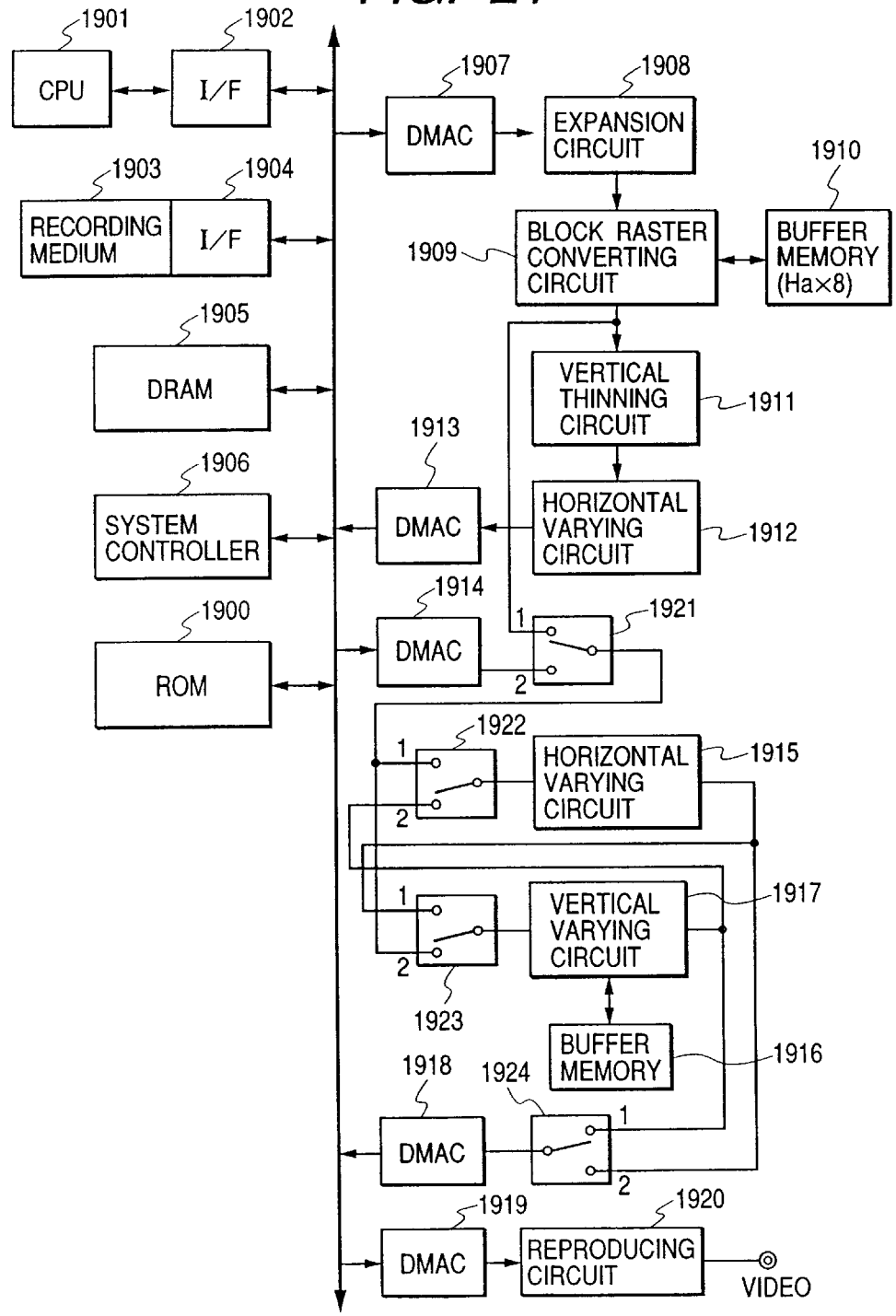
FIG. 21 is a block diagram showing the structure of an image processing apparatus according to a third embodiment of the invention.

FIG. 21 is a block diagram of an image processing apparatus according to the third embodiment. The image processing apparatus of this embodiment has generally the same structure as the second embodiment shown in FIG. 19, excepting that four switches 1921 to 1924 are additionally used.

A first varying circuit is constituted of a vertical thinning circuit 1911 and a horizontal varying circuit 1912, and a second varying circuit is constituted of a horizontal varying circuit 1915 and a vertical thinning circuit 1917. The switch 1921 selects an input to the second varying circuit by switching between an output of a DMAC 1914 and an output of a block/raster converting circuit 1909. The switches 1922 to 1924 can change the order of the horizontal varying circuit 1915 and vertical varying circuit 1917. Namely, if all the switches 1922 to 1924 are turned to the contact "1" side, the order of the horizontal varying circuit 1915 to vertical varying circuit 1917 is set, whereas if all the switches 1922 to 1924 are turned to the contact "2" side, the order of the vertical varying circuit 1917 to horizontal varying circuit 1915 is set.

Next, the operation of this embodiment will be described. Consider now the case wherein the aspect ratio of an original image size of a JPEG compression file is 4:3 having 320 horizontal pixels and 240 vertical pixels, image data of YUV422 is expanded to 752×485, the capacity of a buffer memory 1910 in the horizontal direction is Ha=320, and the capacity of a buffer memory 1916 is Hb=640. In this case, since Ha is equal to the horizontal pixel size of the original image, it is not necessary to perform the horizontal division process. Therefore, the switch 1921 is turned to the contact "1" side and all the switches 1922 to 1924 are turned to the contact "2" side to perform signal processing in the order from the block/raster converting circuit 1909 to the vertical varying circuit 1917, horizontal varying circuit 1915, DMAC 1918 and to DMAC 1905.

First the vertical varying circuit 1917 configures the buffer memory 1916 so as to have two line memories of 320 pixels such as shown in FIG. 16. However, since the division process is not performed, the pixel number B register 1403, division number register 1404, phase storing circuit 1407 and the like shown in FIG. 16 are not necessary. The expanding and varying process is then performed by setting a variation factor of the vertical varying circuit 1917 to $97/48$ and a variation factor of the horizontal varying circuit 1915 to $47/20$, so that the horizontal pixels are expanded to 320× $47/20$=752 and the vertical pixels are expanded to 240×$97/48$= 485. Therefore, expanded and reproduced image data of 752×485 can be obtained without using the temporary data area shown in FIG. 20.

In this embodiment, the expansion process is realized by providing the vertical varying circuit 1917 with the line memory of two lines. The vertical expansion process may be realized by repeating one line transfer of an output of the block/raster circuit 1901. Also in this embodiment, although a LPF circuit is not provided at the preceding stage of the varying circuit, a LPF circuit may be inserted so that an image having less aliasing can be obtained. Further, although the linear interpolation is used as the interpolating method, a cubic interpolating method may also be used.

(Other Embodiments)

The present invention may be applied to a system constituted of a plurality of apparatuses (e.g., a host computer, interface units, a reader, a printer, and the like) or to a system constituted of a single apparatus (e.g., a digital VTR, a digital camera, a digital television or the like).

The scope of the invention also includes a system or apparatus whose computer (CPU or MP) runs to operate various devices connected thereto in accordance with software program codes supplied to the system or apparatus so as to realize the functions of the above embodiments.

In this case, the software program codes themselves realize the embodiment functions. Therefore, the program codes themselves and means for supplying such program codes to a computer, e.g., a storage medium storing such program codes, constitute the present invention.

The storage medium storing such program codes may be a floppy disk, a hard disk, an optical disk, a magneto-optical disk, a CD-ROM, a magnetic tape, a non-volatile memory card, a ROM, and a like.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made with a scope equivalent to the scope of the claims fall within the true spirit and scope of the invention.

What is claimed is:

1. An image processing apparatus comprising:
   an input unit, arranged to input image data on a block basis, which block is divided from one picture image;
   an interpolation or reduction unit, arranged to execute an interpolation or reduction processing of pixels for the image data;
   a storage unit, arranged to store pixel data arranged in a vertical direction at an edge portion of a block adjacent to a subject block to be subjected to the processing, wherein said interpolation or reduction unit uses the pixel data stored in said storage unit to interpolate or reduce pixel data for the subject block; and
   an output unit, arranged to output the image data which has undergone the interpolation or reduction processing.

2. The apparatus according to claim 1, wherein said interpolation or reduction unit is arranged to store phase information of the image data and to execute the interpolation or reduction processing on the basis of the phase information.

3. The apparatus according to claim 1, wherein said input unit includes:
   a decoding unit, arranged to decode the image data encoded on the block basis; and
   a conversion unit, arranged to convert the decoded image data into image data of a raster scan sequence on a block basis different from that of encoding of the image data.

4. The apparatus according to claim 3, wherein the image data inputted by the input unit is image data which was encoded with a JPEG encoding method.

5. The apparatus according to claim 3, wherein said input unit includes a first DMA controller that effects DMA transfer input of the encoded image data from a memory, and wherein said output unit includes a second DMA controller that effects DMA transfer output to the memory, of the image data which has undergone the interpolation or reduction processing.

6. An image processing method comprising:
   an input step, of inputting image data on a block basis, which block is divided from one picture image;
   an interpolation or reduction step, of executing an interpolation or reduction processing of pixels for the image data, wherein said interpolation or reduction step includes storing pixel data arranged in a vertical direction at an edge portion of a block adjacent to a subject block to be subjected to the processing, and using the stored pixel data to interpolate or reduce pixel data for the subject block; and
   an output step, of outputting the image data which has undergone the interpolation or reduction processing.

7. A computer readable storage medium storing an image processing program, the program comprising:
   an input process, of inputting image data on a block basis, which block is divided from one picture image;
   an interpolation or reduction process, of executing an interpolation or reduction processing of pixels for the image data, wherein said interpolation or reduction process includes storing pixel data arranged in a vertical direction at an edge portion of a block adjacent to a subject block to be subjected to the processing, and using the stored pixel data to interpolate or reduce pixel data for the subject block; and
   an output process, of outputting the image data which has undergone the interpolation or reduction processing.

* * * * *

UNITED STATES PATENT AND TRADEMARK OFFICE
CERTIFICATE OF CORRECTION

| | | |
|---|---|---|
| PATENT NO. | : 6,798,927 B2 | Page 1 of 1 |
| APPLICATION NO. | : 10/458301 | |
| DATED | : September 28, 2004 | |
| INVENTOR(S) | : Masato Kosugi et al. | |

It is certified that error appears in the above-identified patent and that said Letters Patent is hereby corrected as shown below:

COLUMN 6:

Line 50, "(Word)" should read --(word)--.

Signed and Sealed this

Seventeenth Day of July, 2007

JON W. DUDAS
*Director of the United States Patent and Trademark Office*